United States Patent
Nagano et al.

(10) Patent No.: US 8,600,211 B2
(45) Date of Patent: Dec. 3, 2013

(54) ELECTRONIC APPARATUS, REPRODUCTION METHOD, AND PROGRAM

(75) Inventors: Kae Nagano, Tokyo (JP); Soichiro Niho, Kanagawa (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 12/743,674

(22) PCT Filed: Nov. 27, 2008

(86) PCT No.: PCT/JP2008/071540
§ 371 (c)(1),
(2), (4) Date: May 19, 2010

(87) PCT Pub. No.: WO2009/075190
PCT Pub. Date: Jun. 18, 2009

(65) Prior Publication Data
US 2010/0278509 A1    Nov. 4, 2010

(30) Foreign Application Priority Data
Dec. 10, 2007  (JP) ................ 2007-318876

(51) Int. Cl.
*H04N 5/77*  (2006.01)
*H04N 5/76*  (2006.01)
*H04N 5/92*  (2006.01)
*H04N 5/84*  (2006.01)
*H04N 5/89*  (2006.01)

(52) U.S. Cl.
USPC .......... 386/223; 386/341; 386/326; 386/332; 386/334; 386/336; 386/337

(58) Field of Classification Search
USPC .......... 386/223, 341, 326, 332, 334, 336, 337
See application file for complete search history.

(56) References Cited

U.S. PATENT DOCUMENTS

2007/0189725 A1 *  8/2007  Johnson et al. ............ 386/96
2009/0067813 A1 *  3/2009  Johnson et al. ............ 386/98

FOREIGN PATENT DOCUMENTS

JP    8-289214    11/1996
JP    10-248049    9/1998
(Continued)

OTHER PUBLICATIONS

Notificationo f Reasons for Refusal with English language translation issued by Japanese Patent Office on Aug. 19, 2011 in corresponding Japanese application No. 2007-318876.

*Primary Examiner* — Daquan Zhao
(74) *Attorney, Agent, or Firm* — Finnegan, Henderson, Farabow, Garrett & Dunner, L.L.P.

(57) ABSTRACT

[Object] To reproduce a plurality of video contents recorded on a recording medium on one screen and select and reproduce any of the video contents without using a plurality of dedicated decoders.
[Solving Means] A recording/reproducing apparatus (100) reads single angle videos (21) that are shot from a plurality of angles and a multi-angle video (22) obtained by performing authoring on those single angle videos (21) so as to be reproducible on one screen from a BD-ROM (10), combines a time-line operation bar (61) and a cursor (66) with the multi-angle video (22), and displays a multi-angle screen (60). When an operation of selecting a single angle video (21) on which the cursor (66) is positioned is performed on the multi-angle screen (60), the single angle video (21) is reproduced in full screen based on a time code at a time when the selection operation is made. When an operation of pressing a multi-angle key (23) is performed during the full-screen reproduction, the multi-angle screen (60) is reproduced again based on a time code at a time when the press operation is made.

12 Claims, 15 Drawing Sheets

(56) References Cited

FOREIGN PATENT DOCUMENTS

| | | |
|---|---|---|
| JP | 11-103444 | 4/1999 |
| JP | 11-341443 | 12/1999 |
| JP | 2000-175154 | 6/2000 |
| JP | 2000-175164 | 6/2000 |
| JP | 2001-238175 | 8/2000 |
| JP | 2000-295560 | 10/2000 |
| JP | 2001-223991 | 8/2001 |
| WO | WO 2006/103578 | 10/2006 |

* cited by examiner

ELECTRONIC APPARATUS, REPRODUCTION METHOD, AND PROGRAM

TECHNICAL FIELD

The present invention relates to an electronic apparatus capable of reproducing a video content, a reproduction method for the electronic apparatus, and a program therefor.

BACKGROUND ART

In recent years, with the appearance of high-capacity media such as BDs (Blu-ray Discs), it has become possible to record a plurality of video contents on not only an HDD (Hard Disk Drive) but also one optical disc. Further, along with the broadbandization of communication networks, reproducing apparatuses have become possible to receive a plurality of video contents by streaming at high-speed or download them at high-speed for reproduction.

For example, by using media that contain a plurality of video contents obtained by shooting events such as a sports game, a concert, and a theater from many angles, a reproducing apparatus can reproduce a video content obtained from a desired angle of a user by switching. Further, the reproducing apparatus can receive a plurality of video contents as described above via a network and reproduces them by switching therebetween.

However, in the reproducing apparatus in the related art, it has been difficult to compare the plurality of video contents for selection while reproducing them simultaneously. This is because a simultaneous reproduction of all the video contents in the reproducing apparatus requires video decoders as many as the video contents to be reproduced. In other words, the number of video decoders that are mounted to a consumer apparatus is generally one or two, and in order to satisfy a decoding function for three or more video contents, a system with high performance has been required.

As a technique of simultaneously displaying a plurality of video contents, Patent Document 1 below discloses that a transmission apparatus transmits broadcast signals corresponding to, for example, 16 broadcast channels to an AV system while arranging the broadcast signals to sub-screens obtained by dividing a multi-screen as one screen into 16, the AV system decodes those broadcast signals to display the multi-screen on a monitoring apparatus, and in a case where a user performs an operation of selecting one sub-screen on the multi-screen using a remote commander, a broadcast signal of a broadcast channel of that sub-screen is received to be displayed individually on the monitoring apparatus.
Patent Document 1: Japanese Patent Application Laid-open No. Hei 8-289214 (FIG. 8, FIG. 33, etc.)

DISCLOSURE OF THE INVENTION

Problem to be Solved by the Invention

However, in the technique disclosed in Patent Document 1 above, the multi-screen itself as well as programs of the sub-screens within the multi-screen are broadcast from the transmission apparatus as broadcast signals of individual broadcast channels. Accordingly, in a case where one sub-screen is selected from the multi-screen, the AV system only needs to receive a broadcast signal of a broadcast channel corresponding to that sub-screen by controlling a tuner in order to individually display a program displayed on that sub-screen.

However, in order to display a plurality of video contents recorded on a recording medium incorporated in a reproducing apparatus or a portable recording medium such as an optical disc on one screen without depending on the broadcast, the reproducing apparatus still requires the same number of decoders as the number of video contents, and costs and loads are caused accordingly.

In view of the circumstances as described above, it is an object of the present invention to provide an electronic apparatus capable of reproducing a plurality of video contents recorded on a recording medium on one screen and selecting and reproducing any of the video contents without using a plurality of dedicated decoders, a reproduction method, and a program therefor.

Means for Solving the Problem

In order to solve the above problems, an electronic apparatus according to a main aspect of the present invention includes an input means, a reproduction means, an operation input means, and a control means. The input means inputs a plurality of different first video contents each having the same first time code and a second video content having a second time code that is the same as the first time code, the second video content being edited so that the plurality of first video contents are simultaneously reproduced within one screen. The reproduction means reproduces the input first and second video contents. The operation input means inputs, from a user, a first operation of selecting any of the first video contents during reproduction of the second video content. The control means controls the reproduction means to, in a case where the first operation is input, reproduce the selected first video content based on the first time code corresponding to the second time code at a time when the first operation is input.

Here, "a plurality of different first contents each having the same first time code" are, for example, video contents that are obtained by shooting the same target from a plurality of angles at the same hour, a so-called multi-angle shooting, video contents that are obtained by respectively shooting a plurality of targets existing in different locations at the same hour, or video contents that respectively contain a plurality of different stories proceeding at the same hour. The input means may be means for reading the first and second video contents from a recording medium such as an optical disc on which the first and second video contents are recorded. Further, the input means may also be means (including so-called IPTV) for receiving the first and second video contents that are recorded in an information processing apparatus (server) connected to that electronic apparatus via a network, from the information processing apparatus. In addition, the input means may be means for receiving the first and second video contents as broadcast signals from a broadcast station. The operation input means is, for example, a remote controller including operation buttons, a keyboard, a mouse, or a touch pad. The first operation is, for example, a press operation of a determination key or a movement operation of a cursor. The reproduction means includes means for decoding each of the first and second video contents and a display means for displaying each of them. Here, as the display means, there is also included a case where the first and second video contents are output so as to be reproducible on a display apparatus that is externally connected to the electronic apparatus, in addition to a case where the electronic apparatus incorporates a display means such as a display that displays reproduction screens of the first and second video contents.

According to the structure of the present invention, the plurality of first video contents are edited into one video content as a second video content in advance so that the plurality of first video contents can be independently reproduced. Accordingly, the electronic apparatus selects any of the first video contents and refers to the first and second time codes while reproducing the second video content, with the result that the selected first video content can be reproduced. In other words, the electronic apparatus does not need a plurality of decoders and can switch to reproduction of any video content of a plurality of video contents having the same time code while simultaneously reproducing the plurality of video contents based on the selection of a user.

In the electronic apparatus, the first and second video contents may be recorded on a portable recording medium, and the input means may include means for reading each of the first and second video contents from the recording medium.

Here, the portable recording medium is, for example, an optical disc such as a BD (Blu-ray Disc), a DVD (Digital Versatile Disc), and a CD (Compact Disc), or a card-type recording medium such as a memory card incorporating a semiconductor memory like a flash memory.

Accordingly, even when the electronic apparatus does not include a plurality of decoders, the electronic apparatus can simultaneously reproduce the plurality of first video contents as the second video content and select therefrom a desired first video content of the user as long as being capable of reproducing a portable recording medium.

In the electronic apparatus, the reproduction means may include one decoder that decodes the first and second video contents. The operation input means may input, from the user, a second operation of instructing reproduction of the second video content during the reproduction of the first video content. The control means may control the reproduction means to, in a case where the first operation is input, reproduce the first video content instead of the second video content based on the first time code corresponding to the second time code at the time when the first operation is input. Further, the control means may control the reproduction means to, in a case where the second operation is input, reproduce the second video content instead of the first video content based on the second time code corresponding to the first time code at a time when the second operation is input.

Accordingly, the electronic apparatus can reproduce the first video contents and the second video content by switching therebetween with ease based on the first and second time codes. Therefore, a user can select and reproduce a desired first video content based on the second video content, and thereafter call the second video content again to select and reproduce another first video content with ease.

In the electronic apparatus, the reproduction means may include a first decoder that decodes the first video contents and a second decoder that decodes the second video content. The control means may control the reproduction means to reproduce the first video contents in a first area within the one screen and control the reproduction means to reproduce the second video content in a second area that is different from the first area within the one screen.

Accordingly, the electronic apparatus can reproduce the first video contents and the second video content constituted of the plurality of first video contents simultaneously within one screen by only two decoders. Therefore, the electronic apparatus selects and reproduces a first video content while reproducing the second video content, and further selects another first video content from the second video content being reproduced while reproducing the selected first video content, with the result that the electronic apparatus can switch the first video content previously selected to the first video content newly selected for reproduction. In other words, the electronic apparatus can simultaneously reproduce the first video contents and the second video content without switching the screen, and reproduce the first video contents desired by the user at random. Here, the first area and the second area are arranged horizontally or vertically, for example.

In this case, the control means may control the reproduction means to, in a case where the first operation is input, reproduce the selected first video content based on the first time code corresponding to a third time code obtained by adding a predetermined time to the second time code at the time when the first operation is input.

Accordingly, by reproducing the first video content using the third time code obtained by adding the predetermined time to the second time code at the time when the first operation is input, the electronic apparatus can correct a delay that is caused by a search time of the second time code during a time from an input of the first operation to the reproduction. Since the other first video contents that are not selection targets in the second video content are continuously being reproduced even when the first operation is input, when the electronic apparatus reproduces a first video content as a selection target by using a time code at a time when the first operation is input without change, a delay of a time code that corresponds to the search time is caused with the other first video contents that are not selection targets. With the structure described above, however, by correcting the delay, the electronic apparatus can synchronize a first time code of a first video content as a selection target and a second time code of a second video content including the other first video contents and seamlessly reproduce the first and second video contents without bringing a feeling of discomfort. Here, the predetermined time is a time of 0.5 seconds or 1 second, for example, but is not limited thereto.

Further, in this case, the control means may include means for judging whether the third time code and the second time code at a time when the selected first video content is reproduced are matched with each other, and means for performing correction so that the third time code is matched with the second time code, in a case where it is judged by the comparison that the third time code and the second time code are not matched with each other.

Accordingly, even when a lag is caused between the third time code added with the predetermined time and the second time code, the electronic apparatus can reproduce the first and second video contents without bringing a feeling of discomfort further by adjusting the lag.

The electronic apparatus may further include a storage means for storing reproduction history information of the plurality of first video contents that have been reproduced based on an input of the first operation. In this case, the control means may include a generation means for generating, based on the reproduction history information, a third video content in which the plurality of first video contents that have been reproduced are linked in a reproduction order. Further, the reproduction means may reproduce the generated third video content.

Accordingly, the electronic apparatus can generate a unique video content in which the first video contents switch in an order desired by a user to display it while reflecting a degree of attention of the user with respect to the plurality of first video contents. The third video content is stored in the storage means as an automatic playlist, for example, and the user can select a desired automatic playlist from a plurality of automatic playlists to reproduce it.

In the electronic apparatus, the reproduction means may include means for adding a predetermined video effect to the reproduced first video contents. The storage means may store the added predetermined video effect as a part of the reproduction history information of each of the first video contents. The generation means may generate the third video content by linking the first video contents with the stored predetermined video effects being added.

Here, the predetermined video effect is, for example, effect processing of adjusting a speed of reproduction such as slow reproduction, fast-forward reproduction, and frame-by-frame reproduction, or effect processing of adjusting brightness, contrast, and the like of a video. Accordingly, the electronic apparatus can generate the respective first video contents as the third video content by linking them with an effect desired by the user being added. In other words, the electronic apparatus can generate the third video content that matches preference of the user more.

In the electronic apparatus, the control means may include means for controlling the reproduction means to display a time-line image that indicates a time line of the second video content and an icon that indicates a predetermined scene having the second time code predetermined on the time line, together with the reproduced second video content. Further, the control means may include means for controlling the reproduction means to move a reproduction point of the second video content to the predetermined scene based on the second time code corresponding to the icon in a case where an operation of selecting the icon is input by the operation input means from the user.

Here, the predetermined scene is, for example, a highlight scene or a scene in which a specific person or object appears. For example, in a case where the first and second video contents are video contents obtained by shooting a soccer game, the predetermined scene is, for example, a shot scene or a goal scene. In this case, the control means may recognize a predetermined scene and associate it with the icon based on information that is included in the first video content in advance and indicates the predetermined scene, or may reproduce the first video content in advance and detect a predetermined scene by detecting video features or the like. Accordingly, the electronic apparatus can easily select predetermined scenes such as highlight scenes included in the plurality of first video contents and simultaneously reproduce them.

In this case, the operation input means may input, from the user, a third operation of designating any position on the displayed time-line image during the reproduction of the second video content. Further, the control means may control the reproduction means to display the icon at the designated any position on the displayed time-line image so that the icon can be selected in a case where the third operation is input. In this case, the electronic apparatus may further include a storage means for storing the second time code for reproducing the second video content from a scene corresponding to the any position at which the icon is displayed.

Accordingly, the electronic apparatus can display the icon at the position desired by the user on the time line. Therefore, after that icon is displayed, the electronic apparatus can start reproduction from a desired scene by the user selecting that icon.

In the electronic apparatus, the plurality of first video contents may be respectively shot in different predetermined locations, and the second video content may include a predetermined map image including the predetermined locations and a plurality of areas that are arranged to respectively reproduce the plurality of first video contents at positions indicating the predetermined locations on the predetermined map image.

Here, the predetermined map image is, for example, a world map, a country map such as a map of Japan, or a map indicating a predetermined area such as a prefecture of Japan. Accordingly, the electronic apparatus can input first video contents obtained by shooting events that are simultaneously proceeding in different locations of the world and a second video content in which those first video contents are arranged in the respective locations on an image of the world map so as to be reproducible. In other words, the electronic apparatus can select and reproduce the first video content from the second video content using an interface that is intuitive and capable of increasing interests.

A reproduction method according to another aspect of the present invention includes inputting a plurality of different first video contents each having the same first time code and a second video content having a second time code that is the same as the first time code, the second video content being edited so that the plurality of first video contents are simultaneously reproduced within one screen. The second video content is reproduced. A first operation of selecting any of the first video contents from a user is input during reproduction of the second video content. In a case where the first operation is input, the selected first video content is reproduced based on the first time code corresponding to the second time code at a time when the first operation is input.

A program according to still another aspect of the present invention is for causing an electronic apparatus to execute an input step, a reproduction step, an operation input step, and a control step. In the input step, a plurality of different first video contents each having the same first time code and a second video content having a second time code that is the same as the first time code, the second video content being edited so that the plurality of first video contents are simultaneously reproduced within one screen, are input. In the reproduction step, the second video content is reproduced. In the operation input step, a first operation of selecting any of the first video contents from a user is input during reproduction of the second video content. In the control step, in a case where the first operation is input, control is made so that the selected first video content is reproduced based on the first time code corresponding to the second time code at a time when the first operation is input.

Effect of the Invention

As described above, according to the present invention, it is possible to reproduce a plurality of video contents recorded on a recording medium on one screen and select and reproduce any of the video contents without using a plurality of dedicated decoders.

BEST MODES FOR CARRYING OUT THE INVENTION

Hereinafter, embodiments of the present invention will be described with reference to the drawings.

First Embodiment

First, a first embodiment of the present invention will be described.

FIG. 1 is a block diagram showing a structure of a recording/reproducing apparatus according to this embodiment.

As shown in the figure, a recording/reproducing apparatus 100 according to this embodiment is connected to a television apparatus 20 (hereinafter, TV 20) as a display means.

The recording/reproducing apparatus 100 includes a digital tuner 1, a demodulation portion 2, a demultiplexer 3, a decoder 4, a recording/reproducing portion 5, an HDD (Hard Disk Drive) 8, an optical disc drive 9, a communication portion 11, a CPU (Central Processing Unit) 12, a ROM (Read Only Memory) 13, a RAM (Random Access Memory) 14, an operation input portion 15, a graphic control portion 16, a video D/A (Digital/Analog) converter 17, and an audio D/A (Digital/Analog) converter 18.

The digital tuner 1 selects a specific channel of a digital broadcast via an antenna (not shown) and receives a broadcast signal including broadcast program data under control of the CPU 12. This broadcast signal is an MPEG stream that is encoded by an MPEG-2 TS format, for example, but is not limited to this format. The demodulation portion 2 demodulates the broadcast signal modulated.

The demultiplexer 3 splits a multiplexed broadcast signal into a video signal and an audio signal. The decoder 4 decodes each of the compressed video signal and audio signal that are split by the demultiplexer 3.

The recording/reproducing portion 5 includes a recording portion 6 and a reproducing portion 7. The recording portion 6 temporarily accumulates the video signal and the audio signal that are decoded by the decoder 4 and input, and outputs them to the HDD 8 or the optical disc drive 9 for recording while controlling a timing and a data amount. The reproducing portion 7 reads out the video signal and the audio signal of the video content recorded on the HDD 8 or an optical disc, and outputs them to the decoder 4 for reproduction while controlling the timing and the data amount.

The HDD 8 stores the broadcast program data received via the digital tuner 1 in a built-in hard disk. The HDD 8 also stores all contents such as video contents received by the communication portion 11 via a network of the Internet or the like and various kinds of video contents, still image contents, music contents, and the like that are input from digital cameras or various kinds of recording media via various kinds of interfaces (not shown). Moreover, the HDD 8 may store various kinds of programs such as applications, other data, and the like in some cases. When those stored data are reproduced, the HDD 8 reads out those data from the hard disk and outputs them to the recording/reproducing portion 5.

In a BD-ROM in this embodiment, in addition to a multi-angle video and a single angle video, a Java® application (hereinafter, Java® appli.) for reproducing the multi-angle video and the single angle video is recorded.

The optical disc drive 9 includes an insertion portion into which an optical disc can be inserted, and can record various kinds of data such as the broadcast program data on the inserted optical disc and read out the recorded data. Examples of the optical disc include a BD (BD-ROM 10), a DVD, and a CD. The Java® appli. is read out from the BD-ROM 10 by the optical disc drive 9 and executed by the CPU 12.

The communication portion 11 includes a network interface for connecting to the network and exchanging data with another apparatus on the network by a protocol such as a TCP/IP (Transmission Control Protocol/Internet Protocol).

The CPU 12 accesses the RAM 14 or the like as necessary and collectively controls processing of the respective blocks of the recording/reproducing apparatus 100, such as data recording and reproduction processing by the recording/reproducing portion 5.

The ROM 13 is a nonvolatile memory in which an OS to be executed by the CPU 12 and firmware such as programs and various kinds of parameters are fixedly stored. The RAM 14 is used as a work area or the like of the CPU 12 and is a memory that temporarily holds the OS, the programs, processing data, or the like.

The operation input portion 15 inputs various kinds of set values or commands from, for example, a remote controller 19 including a plurality of keys in accordance with an operation of a user and outputs them to the CPU 12. Of course, the operation input portion 15 may be constituted of a keyboard or a mouse connected to the recording/reproducing apparatus 100, a switch mounted to the recording/reproducing apparatus 100, or the like, instead of the remote controller 19.

The graphic control portion 16 performs graphic processing such as OSD (On Screen Display) processing on the video signal output from the decoder 4, EPG data output from the CPU 12, or the like and generates a video signal to be displayed on the television apparatus 20.

The video D/A converter 17 converts a digital video signal input from the graphic control portion 16 into an analog video signal and outputs it to the TV 20.

The audio D/A converter 18 converts a digital audio signal input from the decoder 4 into an analog audio signal and outputs it to the TV 20.

The TV 20 displays the analog video signal on a display portion (not shown) and outputs the analog audio signal from a speaker (not shown). The speaker may be incorporated in the television apparatus 20 or externally connected to the television apparatus 20 or the recording/reproducing apparatus 100.

FIG. 2 is a diagram showing an outer appearance of the remote controller 19.

As shown in the figure, the remote controller 19 includes various kinds of keys such as a power key 21, a numerical keypad 22, a multi-angle key 23, a menu key 24, an arrow key 25, an OK key (determination key) 26, a reproduction key 27, a rewind key 28, a fast-forward key 29, a pause key 30, a stop key 31, a volume key 32, and a channel key 33.

The power key 21 is for switching on/off a power of the recording/reproducing apparatus 100. The numerical keypad 22 is for selecting a broadcast channel or selecting a desired single angle video (described later) on a multi-angle screen (described later) when the BD-ROM 10 is reproduced.

The multi-angle key 23 is for displaying the multi-angle screen when the BD-ROM 10 is reproduced. The menu key 24 is for displaying a menu screen (described later) when the BD-ROM 10 is reproduced.

The arrow key 25 is for moving a cursor on the multi-angle screen or the like. The OK key 26 is for performing various kinds of determination operations when the single angle video is selected or the like.

The reproduction key 27, the rewind key 28, the fast-forward key 29, the pause key 30, and the stop key 31 are for performing reproduction, rewind, fast-forward, pause, and stop of various contents such as a multi-angle video and a single angle video, respectively. Further, by using those keys in combination, for example, it becomes possible to perform slow reproduction, frame-by-frame reproduction, fast-forward reproduction, and the like.

The volume key 32 is for adjusting a reproduction volume of contents when various contents are reproduced. The channel key 33 is for switching a broadcast channel to be selected.

Moreover, though not shown, the remote controller 19 is also provided with a key for adjusting saturation, brightness, contrast, and the like of the screen, for example.

Next, the BD-ROM 10 that is reproduced in this embodiment will be described.

FIG. 3 is a diagram conceptually showing a video content recorded on the BD-ROM 10 in this embodiment.

As shown in the figure, nine single angle videos 35 (first video contents) that are obtained by simultaneously shooting, for example, an event such as a soccer game by, for example, nine cameras from nine different angles (angles #1 to 9) are included in the BD-ROM 10. In addition, a multi-angle video 36 (second video content) that is obtained by collectively performing authoring on those single angle videos 35 so that those single angle videos 35 can be reproduced on one screen is also included in the BD-ROM 10. Of course, the number of single angle videos 35 is not limited to nine. In the authoring process, the multi-angle video 36 is subjected to effect processing for creating an index table that will be described later or adjusting time codes among the single angle videos 35. Further, as the effect processing, processing of detecting a highlight scene from each of the single angle videos 35 and recording time code information for displaying a highlight scene icon (described later) on the multi-angle screen is also performed.

FIG. 4 is a diagram showing the index table recorded on the BD-ROM 10.

As shown in the figure, entry points of "First Playback", "Top Menu", and "Title 1" to "Title N" are described in an index table 40. "First Playback" defines an entry point at a time when the BD-ROM 10 is inserted into the recording/reproducing apparatus 100. "Top Menu" defines an entry point of the menu screen. "Title 1" to "Title N" define entry points of respective titles of the multi-angle video and the plurality of single angle videos. The recording/reproducing apparatus 100 displays the menu screen or the respective titles with reference to the index table 40 when the BD-ROM 10 is inserted.

It should be noted that in this embodiment, an entry point to the menu screen is described in "First Playback". In other words, in this embodiment, the menu screen is displayed at a time when the BD-ROM 10 is inserted as well as a time when the menu key 24 of the remote controller 19 is pressed. However, an entry point to another title may of course be described in "First Playback".

FIG. 5 is a diagram showing an example of the menu screen displayed on the TV 20 when the BD-ROM 10 is inserted.

As shown in the figure, in addition to the multi-angle video, links 51 to 54 for reproducing a highlight video and other bonus contents are displayed on a menu screen 50 together with thumbnail images 55 to 58 of respective video contents, for example.

As described above, this menu screen 50 is displayed when the BD-ROM 10 is inserted or a user presses the menu key 24. The user can reproduce the respective video contents by selecting the links 51 to 54 of the respective video contents on the menu screen 50 using the arrow key 25 and the OK key 26.

FIG. 6 is a diagram showing a multi-angle screen that is displayed on the TV 20 based on the multi-angle video 36 recorded on the BD-ROM 10.

As shown in FIG. 6, the multi-angle video 36 is reproduced on this multi-angle screen 60. In other words, the nine single angle videos 35 are reproduced as a list of nine areas of three rows by three columns by PinP (Picture in Picture), for example. Further, a cursor 66 for selecting any of the single angle videos 35 is displayed on this multi-angle screen 60. Upon selection of any of the single angle videos 35 using the cursor 66 and the OK key 26, the selected single angle video 35 is displayed in full screen (not shown) by being switched from the multi-angle screen 60.

For example, at a lower portion of the multi-angle screen 60, a time-line operation bar 61 for indicating a time line of the single angle video 35 and the multi-angle video 36 and changing a reproduction point is displayed. This time-line operation bar 61 includes a bar 62 and a focus 63 that indicates on the bar 62 a current reproduction point in a total reproduction time of the single angle video 35 and the multi-angle video 36. As described above, in this embodiment, each of the single angle videos 35 that are reproduced on the multi-angle screen 60 is a video of a soccer game. In this case, the two bars 62 are provided in accordance with a first half and a second half of the game, for example, and the focus 63 indicates an elapsed time of the game.

In addition, the time-line operation bar 61 includes highlight scene icons for changing the reproduction point to highlight scenes of the single angle video 35 and the multi-angle video 36. In this embodiment, a goal icon 64 that indicates a scene of a goal and a shot icon 65 that indicates a scene of a shot are displayed as the highlight scene icons.

The Java® appli. reads out time code information corresponding to the goal icon 64 and the shot icon 65 on the bar 62 from the BD-ROM 10, stores positions on the bar 62 on which the respective icons are displayed, and further stores a correspondence relationship between the respective icons and the time code information as an icon/time-code correspondence table in the RAM 14, for example.

FIG. 7 is a diagram showing that icon/time-code correspondence table. As shown in the figure, an icon/time-code correspondence table 80 stores an icon# that discriminates the goal icon 64 and the shot icon 65 in a chronological order, for example, and time code information corresponding to that icon#.

Based on an operation of the arrow key 25, the cursor 66 can move on the time-line operation bar 61 in addition to the nine areas of the angles #1 to 9. Specifically, when a downward direction key of the arrow key 25 is pressed in a state where the cursor 66 is positioned in lowermost row areas 75 (angles #7 to 9) out of areas 75 of three rows by three columns, for example, the cursor 66 moves to the focus 63 of the bar 62. In this state, when a leftward direction key or a rightward direction key of the arrow key 25 is pressed, for example, the recording/reproducing apparatus 100 changes the reproduction point of the multi-angle screen 60 in accordance with the movement of that focus 63.

In a case where the downward direction key of the arrow key 25 is pressed in a state where the cursor 66 is positioned on the focus 63, for example, the recording/reproducing apparatus 100 moves the cursor 66 to the goal icon 64 and the shot icon 65 in the chronological order, for example. In a case where the OK key 26 is pressed in a state where the cursor 66 is positioned on the goal icon 64 and shot icon 65, the recording/reproducing apparatus 100 changes the reproduction point of the multi-angle screen 60 to a position indicated by each of the respective icons.

It should be noted that an icon indicating the highlight scene can be uniquely imparted by a user. For example, in a case where the OK key 26 is pressed in a state where the cursor 66 is positioned on the focus 63 during reproduction of the multi-angle screen 60, the Java® appli. displays a pop-up window for confirming with the user whether to register that reproduction point as a highlight scene, and in a case where it is selected to make a registration on that window, only needs to store a time code of that reproduction point as a highlight scene and register it in the icon/time-code correspondence table 80. The icon may be an arrow shape as shown in FIG. 6, and a shape or design of the icon may be customized by selection of the user.

FIG. 8 is a diagram showing a layer structure of the multi-angle screen 60.

As shown in the figure, the multi-angle screen 60 is constituted of two layers of a primary video plane 71 and an interactive graphics plane 72. The primary video plane 71 is combined with the multi-angle video 36. The interactive graphics plane 72 is combined with user interfaces such as the time-line operation bar 61 and the cursor 66, and the areas 75 for reproducing the single angle videos 35 by PinP. The angles #1 to 9 of the nine single angle videos 35 correspond to the areas 75, and the Java® appli. stores positional coordinates of the areas 75.

The Java® appli. recognizes reproduction positions of the single angle videos 35 on the primary video plane 71 in advance, displays the cursor 66 while positioning the areas 75 of the interactive graphics plane 72 in those reproduction positions, and further displays the time-line operation bar 61. Then, the Java® appli. displays (reproduces) the multi-angle screen 60 by reproducing the multi-angle video 36 in a state where the two planes are combined.

Next, an operation of the recording/reproducing apparatus 100 structured as described above will be described.

FIG. 9 is a flowchart showing a reproduction operation of the recording/reproducing apparatus 100 in this embodiment. Further, FIG. 10 is a diagram conceptually showing this reproduction operation. The following operation is executed by cooperation of the CPU 12 of the recording/reproducing apparatus 100 and the Java® appli. of the BD-ROM 10.

As shown in FIG. 9, when the BD-ROM 10 is inserted, the CPU 12 inputs a user operation of selecting reproduction of the multi-angle screen 60 from the menu screen 50 (Step 101). The CPU 12 judges whether that selection operation is made for the first time (Step 102). This judgment is performed based on information that the Java® appli. has stored in previous reproduction of the BD-ROM 10.

In a case where it is judged that the multi-angle screen 60 is selected for the first time (Yes), the CPU 12 reproduces the multi-angle screen 60 from the beginning (Step 103). In other words, the CPU 12 reproduces the multi-angle video 36 from a first frame in the primary video plane 71 and displays the time-line operation bar 61 and the cursor 66 in the interactive graphics plane 72. At this time, the cursor 66 is displayed in an area of the single angle video 35 of the angle #1 (Step 104).

In a case where it is judged that the multi-angle screen 60 has been selected previously (No), the CPU 12 performs resume reproduction of the multi-angle screen 60 based on the information that the Java® appli. stores in the previous reproduction (Step 105). At this time, the CPU 12 displays the cursor 66 in the area 75 of the last angle# that has been selected last in the previous reproduction (Step 106).

Subsequently, the CPU 12 judges whether the single angle video 35 marked by the cursor 66 is selected by the OK key 26 on the multi-angle screen 60 (Step 107). In a case where it is judged that the selection operation is not input (No), the CPU 12 judges whether a movement operation of the cursor 66 is input by the numerical keypad 22 or the arrow key 25 (Step 108).

In a case were the cursor 66 is moved (Yes), the Java® appli. judges whether a selection operation of any of the single angle videos 35 of the angles #1 to 9 is input (Step 109). In a case where it is judged that the selection operation of the single angle video 35 is input (Yes), the Java® appli. recognizes, based on the current coordinates of the cursor 66, an angle #N corresponding to the coordinates (Step 110).

Subsequently, the Java® appli. reads out a time code T1 of the multi-angle screen 60 that is being reproduced (Step 111), and then stops the reproduction of the multi-angle screen 60 (Step 112). Subsequently, the Java® appli. performs cue reproduction of the single angle video 35 of the recognized angle #N in full screen from the read-out time code T1, with the time code T1 as a parameter (Step 113).

The Java® appli. judges whether a press operation of the multi-angle key 23 is input during the reproduction of the single angle video 35 of this angle #N (Step 114). In a case where it is judged that a press operation of the multi-angle key 23 is input (Yes), the Java® appli. reads out a time code T2 of the multi-angle screen 60 at a time when that press operation is made (Step 115). Subsequently, the Java® appli. stops reproducing the single angle video 35 of the angle #N (Step 116), and performs the cue reproduction of the multi-angle screen 60 from the read-out time code T2 (Step 117).

In a case where it is judged in Step 109 above that an selection operation of the goal icon 64 or shot icon 65 is input instead of the angle selection operation (No), the Java® appli. recognizes an icon# based on the coordinates at which that icon is currently positioned (Step 119) and acquires a time code T3 corresponding to that recognized icon# based on the icon/time-code correspondence table 80 (Step 120).

Subsequently, the Java® appli. searches for a reproduction point of the multi-angle screen 60 by the acquired time code T3 (Step 121), and performs cue reproduction of the multi-angle screen 60 from that time code T3 (Step 122).

The CPU 12 and the Java® appli. repeat the above processing each time the movement of the cursor 66 is detected.

Through the above operation, the recording/reproducing apparatus 100 can reproduce a multi-angle screen by one decoder 4 and further switch between reproduction of a multi-angle screen 60 and full-screen reproduction of a single angle video 35 based on a time code, as shown in FIG. 10. Accordingly, by viewing the multi-angle screen 60, a user can select a desired single angle video 35 in a state where all of single angle videos 35 are reproduced and reproduce the single angle video 35 by switching to a full screen.

Second Embodiment

Next, a second embodiment of the present invention will be described. In this embodiment, portions that are the same as the first embodiment are denoted by the same reference symbols and descriptions thereof are omitted or simplified.

FIG. 11 is a block diagram showing a structure of a recording/reproducing apparatus according to this embodiment.

As shown in the figure, a recording/reproducing apparatus 200 in this embodiment includes two decoders 4a and 4b, unlike the recording/reproducing apparatus 100 in the first embodiment that includes one decoder 4. The decoders 4a and 4b are used when the recording/reproducing apparatus 200 reproduces the single angle video 35 and the multi-angle video 36 simultaneously as described later.

FIG. 12 is a diagram showing a multi-angle screen displayed in this embodiment.

In the first embodiment, the recording/reproducing apparatus 200 reproduces the single angle videos 35 as a list on the multi-angle screen 60 and reproduces each of the single angle videos 35 in full screen on another screen of that multi-angle screen 60. In this embodiment, however, the recording/reproducing apparatus 200 executes list reproduction of those single angle videos 35 and enlargement reproduction of one of those single angle videos 35 on one multi-angle screen 160, as shown in FIG. 12.

As shown in the figure, the multi-angle screen 160 in this embodiment includes a plurality of areas (twelve areas in this embodiment) for reproducing the single angle videos 35 as a list on a right-hand side of the screen and an area for enlarging and reproducing one single angle video 35 on a left-hand side of the screen.

On the multi-angle screen 160, the same single angle video 35 as a single angle video 35 that is being reproduced at a position at which the cursor 66 is displayed is also enlarged and reproduced in the area on the left-hand side. Each time the cursor 66 is moved, a single angle video 35 to be reproduced on the left-hand side is also changed.

The time-line operation bar 61 displayed on a lower portion of the multi-angle screen 160 includes goal icons 64 and shot icons 65 as in the first embodiment. In this embodiment, however, the goal icons 64 and the shot icons 65 are separately displayed above and below the bar 62 for each opposing team (Club AAA and Club BBB).

FIG. 13 is a diagram showing a layer structure of the multi-angle screen 160 in this embodiment.

As shown in the figure, the multi-angle screen 160 is constituted of three layers of a primary video plane 171, a secondary video plane 172, and an interactive graphics plane 173. The primary video plane 71 is combined with the multi-angle video 36 as in the first embodiment. The secondary video plane 172 is combined with a single angle video 35 that is being selected by the cursor 66. The interactive graphics plane 72 is combined, as in the first embodiment, with user interfaces such as the time-line operation bar 61 and the cursor 66 and areas 175 for reproducing the single angle videos 35 as a list. In this embodiment, angles #1 to 12 of the twelve single angle videos 35 correspond to the areas 175, and the Java® appli. stores positional coordinates of the areas 175. Further, the Java® appli. includes the icon/time-code correspondence table 80 that is similar to that of the first embodiment.

Next, an operation of the recording/reproducing apparatus 200 structured as described above will be described.

FIG. 14 is a flowchart showing a reproduction operation of the recording/reproducing apparatus 200 in this embodiment. The following operation is also executed by cooperation of the CPU 12 of the recording/reproducing apparatus 200 and the Java® appli. of the BD-ROM 10 as in the first embodiment.

As shown in the figure, upon inputting a user operation of selecting reproduction of the multi-angle screen 160 (Step 201), the CPU 12 judges whether that selection operation is made for the first time (Step 202).

In a case where it is judged that the multi-angle screen 160 is selected for the first time (Yes), the Java® appli. reproduces the multi-angle screen 160 from the beginning (Step 203). In other words, the Java® appli. reproduces the multi-angle video 36 from a first frame on the primary video plane 171, reproduces the single angle video 35 from a first frame on the secondary video plane 172, and displays the time-line operation bar 61 and the cursor 66 on the interactive graphics plane 173. At this time, the cursor 66 is displayed in an area of the single angle video 35 of the angle #1 (Step 204). Further, on the secondary video plane 172, that single angle video 35 of the angle #1 is enlarged and reproduced (Step 205).

In a case where it is judged that the multi-angle screen 160 has also been selected previously (No), the Java® appli. performs resume reproduction of the multi-angle screen 160 based on information of the previous reproduction (Step 206). At this time, the Java® appli. displays the cursor 66 in the area 175 of the last angle# that has been selected last in the previous reproduction (Step 207). Further, on the secondary video plane 172, the single angle video 35 of the last angle# is enlarged and reproduced (Step 208).

The Java® appli. subsequently judges whether a movement operation of the cursor 66 is input by the arrow key 25 (Step 209) and further judges whether a single angle video 35 of any angle# is selected or each icon of the goal icons 64 and shot icons 65 is selected by the movement of the cursor 66 (Steps 210 and 219). More specifically, the Java® appli. judges whether the selection is made based on whether the cursor 66 is stopped in the area of each of the single angle videos 35 for the list reproduction or on each of the icons for a predetermined time (for example, 0.5 seconds), for example.

In a case where a single angle video 35 of any angle# is selected, the Java® appli. recognizes, based on current coordinates of the cursor 66, an angle #N corresponding to the coordinates (Step 211).

Subsequently, the Java® appli. reads out a time code T1 of the multi-angle screen 160 that is being reproduced (Step 212) and then adds a predetermined delay time Δt that is set in advance to the time code T1(Step 213).

In a case where the recording/reproducing apparatus 200 executes the list reproduction and enlargement reproduction of the single angle videos 35 on one screen as in this embodiment, a time to search for a time code of a single angle video 35 as a switching target is generated as a delay when a single angle video 35 as a reproduction target is switched by the movement of the cursor 66. In a case where the recording/reproducing apparatus 200 switches between the single angle videos 35 for reproduction without considering this delay based on a time code of a time point at which the movement of the cursor 66 is recognized, since the other single angle videos 35 that are not switching targets are continuously being reproduced on the list reproduction screen, a reproduction position (time code) of the single angle video 35 as the switching target is delayed by the delay.

In this regard, in this embodiment, the recording/reproducing apparatus 200 reproduces a single angle video 35 as a switching target without causing an uncomfortable feeling by predicting the delay in advance and adding the delay to the acquired time code T1.

The CPU 12 stops reproducing the single angle video 35 that is being reproduced on the secondary video plane 172 (Step 214) and performs cue reproduction of the single angle video 35 of the recognized angle #N from the calculated time code T1+Δt on the secondary video plane 172 (Step 215).

Subsequently, the CPU 12 compares a time code of the multi-angle screen 160 (multi-angle video 36) with the time code of the reproduced single angle video 35 of the angle #N, and judges whether both the time codes are matched with each other (Step 216).

In a case where both the time codes are not matched with each other (No), the CPU 12 corrects the Δt by a difference a therebetween so that both the time codes are matched with each other (Step 218), and reproduces the single angle video 35 of the angle #N using the corrected Δt. By this correction processing, processing of reproducing and switching the single angle videos 35 can be executed more accurately.

In a case where it is judged in Step 219 above that a selection operation of the goal icons 64 or shot icons 65 is input instead of an angle selection operation, the CPU 12 executes an operation that is similar to that of the first embodiment (Steps 119 to 122 of FIG. 9) (Steps 220 to 223).

The CPU 12 and the Java® appli. repeat the above processing each time the movement of the cursor 66 is detected.

As described above, two decoders of the decoders 4a and 4b are used for simultaneously reproducing the single angle videos 35 and the multi-angle video 36. According to this embodiment, however, the reproduction processing that has required 13 decoders in the past can be executed using only the two decoders 4.

By the above operation, according to this embodiment, the list reproduction and enlargement reproduction of the single angle videos 35 can be executed on one screen, and convenience of a user is improved.

In this embodiment, the recording/reproducing apparatus 200 can create a user's own playlist based on the switching processing of the single angle videos 35 by the movement of the cursor 66. Hereinafter, this playlist creation processing will be described.

FIG. 15 are diagrams conceptually showing this playlist creation processing.

As shown in FIG. 15(A), the Java® appli. stores, in the RAM 14 etc., a history of the single angle videos 35 that are reproduced by the user moving the cursor 66 on the multi-angle screen 160 as reproduction history information, for example.

Then, as shown in FIG. 15(B), the Java® appli. creates one playlist 151 by linking the reproduced single angle videos 35 in the reproduction order. An example shown in the figure shows that in a case where a user switches between the single angle videos 35 for reproduction in an order of (1) angle #2, (2) angle #7, (3) angle #11, (4) angle #5, and (5) angle #9, a playlist referred to as a "playlist 001" is created based on reproduction history information 152 thereof. It should be noted that this playlist name (playlist 001) can be changed for a name desired by the user by using, for example, a software keyboard created by the Java® appli. and displayed on the TV 20 or the remote controller 19.

As shown in FIG. 15(C), the playlist created as described above is displayed as My Playlist menu 150 on the menu screen 50, for example, and by the user selecting a desired playlist from that My Playlist menu 150, full-screen reproduction becomes possible on the TV 20.

It should be noted that in the playlist creation, the Java® appli. may also store, as the reproduction history information, effect information added when the single angle videos 35 are reproduced, and create a playlist with that effect being included. Here, the effect is slow reproduction, fast-forward reproduction, a level of a volume, a saturation or contrast of the screen, or the like. By including the effect, it is possible to create a playlist that matches preference of the user.

The present invention is not limited to the embodiments described above and various modifications can of course be added within a range without departing from the gist of the present invention.

In the embodiments described above, the recording/reproducing apparatuses 100 and 200 reproduce the nine or twelve single angle videos 35 as a list. However, the number of single angle videos 35 is not limited to the above. FIG. 16 is a diagram showing an example in which a recording/reproducing apparatus generates a multi-angle screen 260 based on 54 single angle videos 35 of six rows by nine columns. In a case where the single angle videos 35 have a total reproduction time that is relatively short and are not high in image quality, the BD-ROM 10 can contain more single angle videos 35. In such a case, the recording/reproducing apparatus can create and reproduce the multi-angle screen by using more single angle videos 35.

In the embodiments described above, the plurality of single angle videos 35 that are reproduced as a list on the primary video planes 71 and 171 are arranged in matrix. However, the single angle videos 35 may also be arranged variously, for example, linearly, in an oblique direction, or in a curve, but not in matrix.

Further, in a case where the single angle videos 35 are those obtained by shooting a plurality of events that proceed in different locations, the recording/reproducing apparatus can combine the single angle videos 35 and a map image showing the respective locations and create a multi-location screen for display. FIG. 17 is a diagram showing this multi-location screen 360.

As shown in the figure, the recording/reproducing apparatus sets a map image as a background together with the time-line operation bar 61 on the interactive graphics plane, and displays on the primary video plane the single angle videos 35 so as to correspond to the respective locations on that map image 361. As the event that proceeds in multiple locations, sports events such as soccer, golf, and F1 or various kinds of events such as a concert, a theater, and a speech are conceivable. By creating the multi-location screen 360 in combination with the map image and the single angle videos 35 in such a manner, the recording/reproducing apparatus can provide a more intuitive interface for a user.

In the embodiments described above, the example in which the single angle videos 35 and the multi-angle video 36 are recorded on the BD-ROM 10 has been described. However, the single angle videos 35 and the multi-angle video 36 may be recorded on other media or in other apparatuses. For example, as shown in FIG. 18, the single angle videos 35 and the multi-angle video 36 may be stored in content servers 250 that are connected to the recording/reproducing apparatus 100 via a network 251. The recording/reproducing apparatus 100 receives the single angle videos 35 and the multi-angle video 36 by the communication portion 11 from the content servers 250, records the single angle videos 35 and the multi-angle video 36 in the HDD 8, for example, and reads out (inputs) them from the HDD 8, with the result that processing that is similar in the embodiments described above can be performed thereafter. In this case, the content servers 250 may store an application that is similar to the Java® appli. together with the single angle videos 35 and the multi-angle video 36, and the recording/reproducing apparatus 100 may receive that application and store it in the HDD 8 or the like.

In the embodiments described above, the example in which the present invention is applied to the recording/reproducing apparatuses 100 and 200 including a broadcast reception means such as the digital tuner 1 and the demodulation portion 2 and a recording means such as the HDD 8 has been described. However, the present invention can also be applied to a reproducing apparatus that does not include the broadcast reception means or the recording means, such as a BD player and a DVD player. Further, the present invention is applicable to PCs or other AV apparatuses, for example, other than recording/reproducing apparatuses and reproducing apparatuses.

In the embodiments described above, the single angle videos 35 and the multi-angle video 36 are those obtained by shooting a soccer game. However, the single angle videos 35 and the multi-angle video 36 may of course be those obtained by shooting a game of other sports or an event such as a concert, a theater, and a speech.

Further, the present invention can be applied to not only a multi-angle video but also video contents obtained by shooting a plurality of targets existing in different locations at the same hour as shown in the example of the multi-location screen 360. In addition, the present invention can also be applied to not only shot video contents but also video contents such as an animation film, a drama, and a movie that contain different stories proceeding at the same hour.

DESCRIPTION OF REFERENCE SYMBOLS

Figure 1:
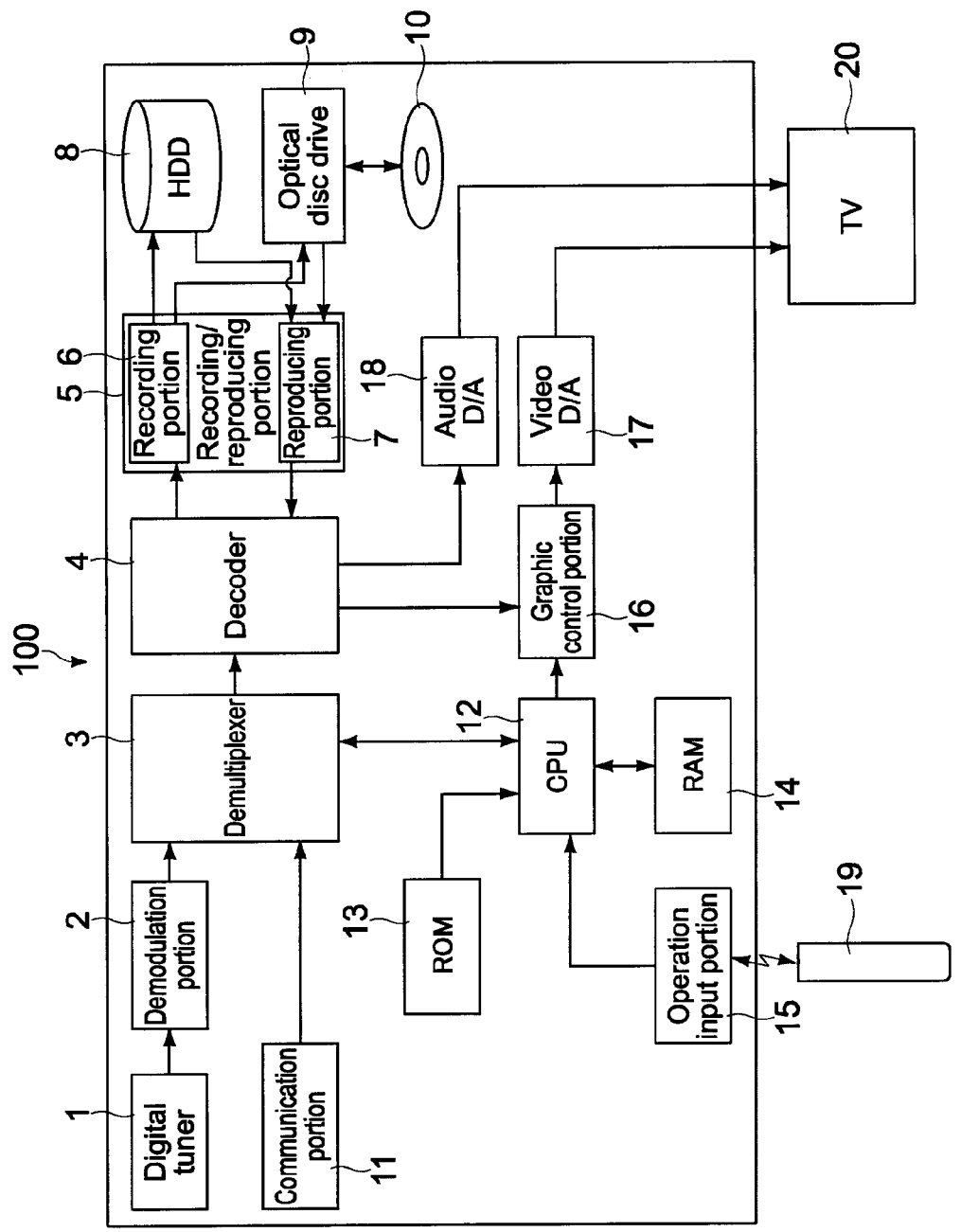
FIG. 1 A block diagram showing a structure of a recording/reproducing apparatus according to a first embodiment of the present invention.
Figure 2:
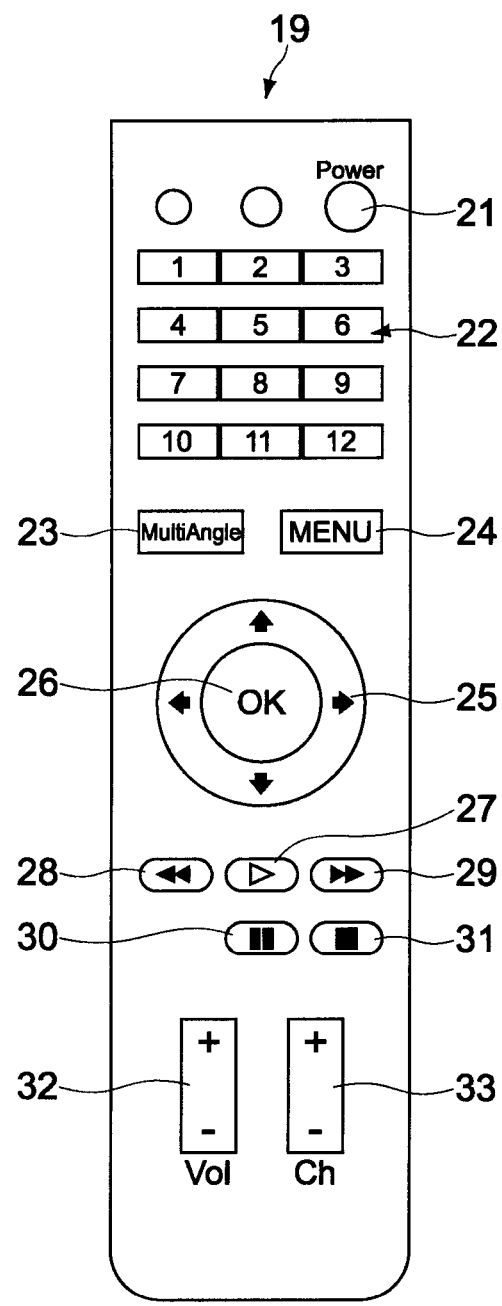
FIG. 2 A diagram showing an outer appearance of a remote controller in the first embodiment of the present invention.
Figure 3:
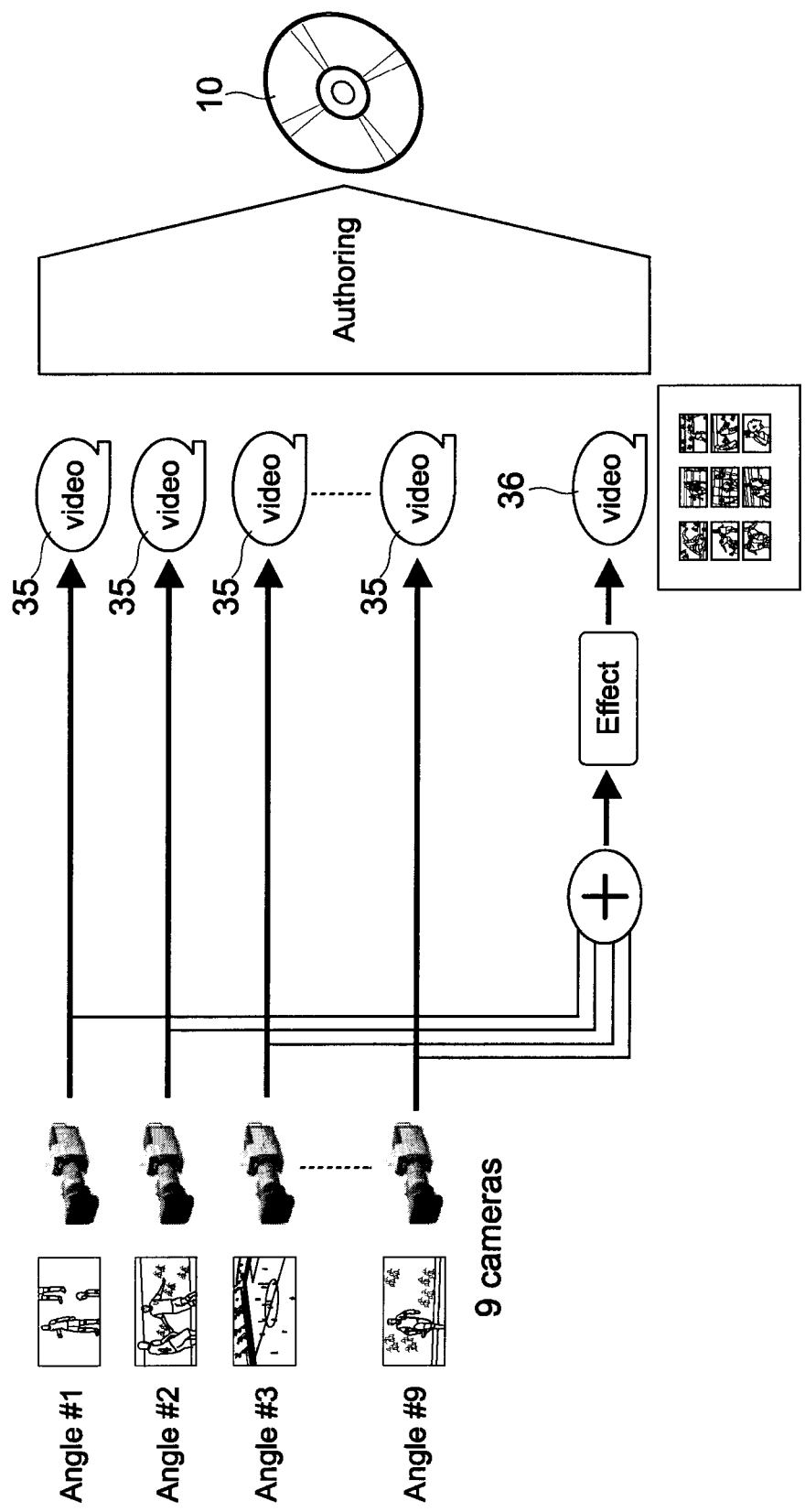
FIG. 3 A diagram conceptually showing a video content recorded on a BD-ROM in the first embodiment of the present invention.
Figure 4:
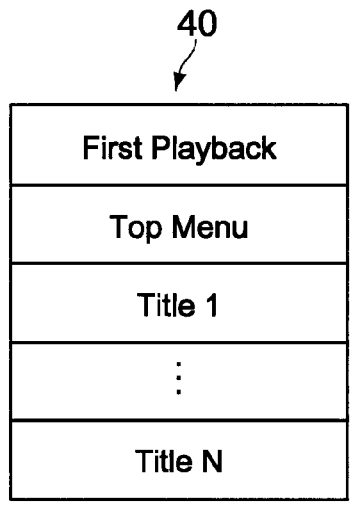
FIG. 4 A diagram showing an index table recorded on the BD-ROM in the first embodiment of the present invention.
Figure 5:
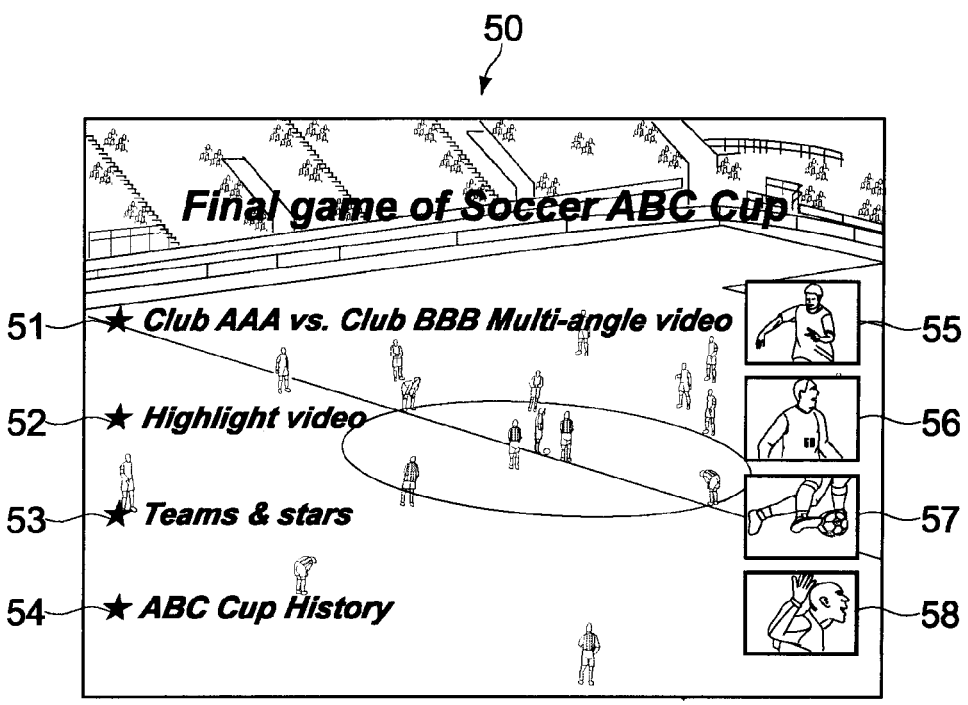
FIG. 5 A diagram showing an example of a menu screen displayed when the BD-ROM is inserted in the first embodiment of the present invention.
Figures 6, 7:
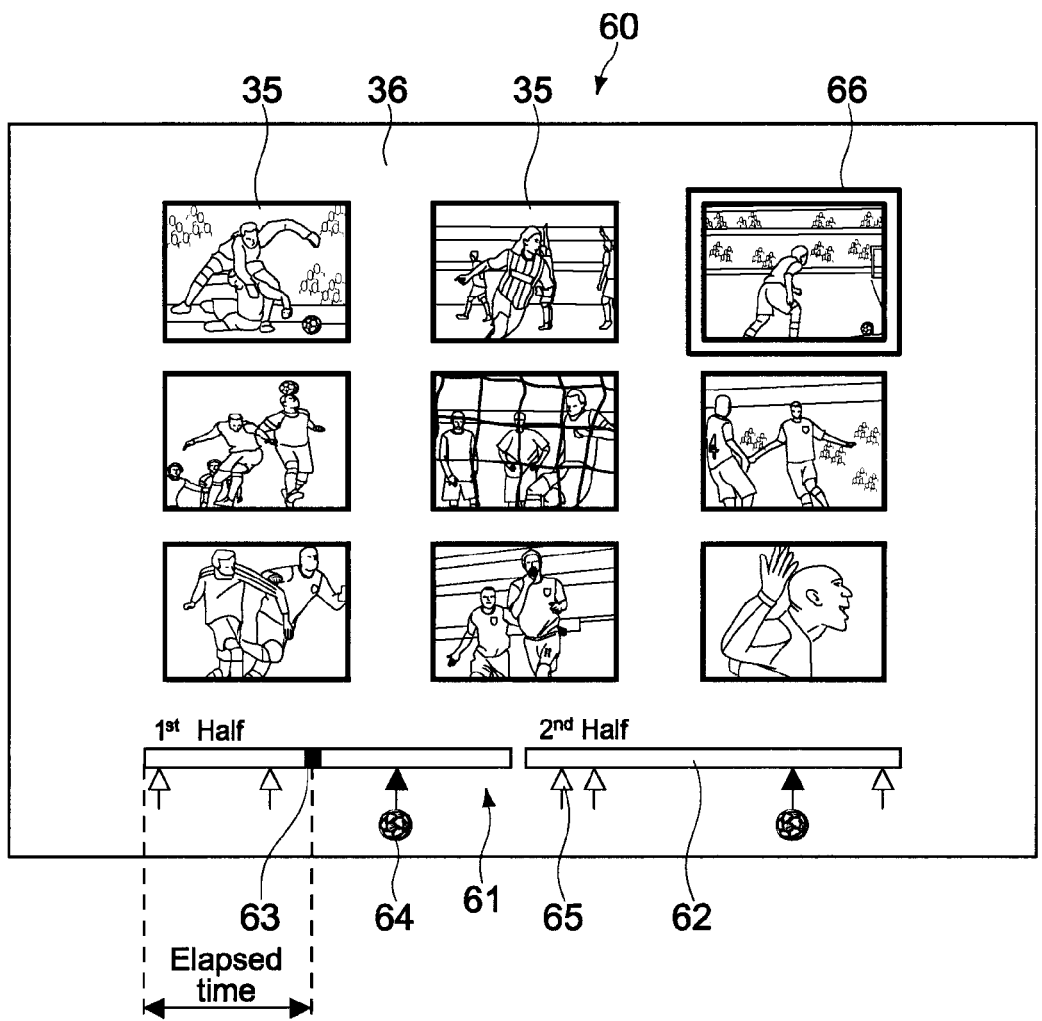
FIG. 6 A diagram showing a multi-angle screen reproduced from the BD-ROM in the first embodiment of the present invention.
FIG. 7 A diagram showing an icon/time-code correspondence table in the first embodiment of the present invention.
Figure 8:
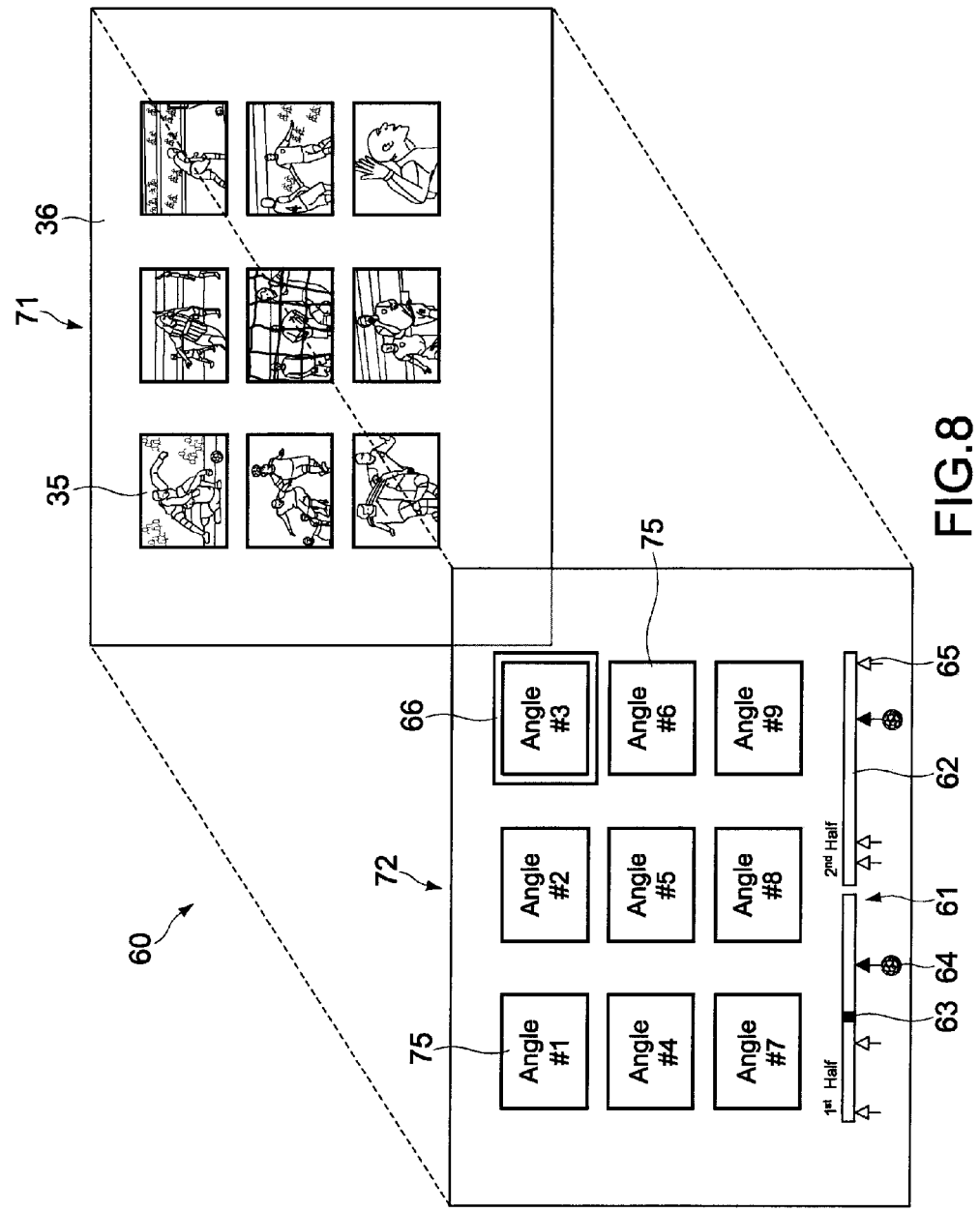
FIG. 8 A diagram showing a layer structure of the multi-angle screen in the first embodiment of the present invention.
Figure 9:
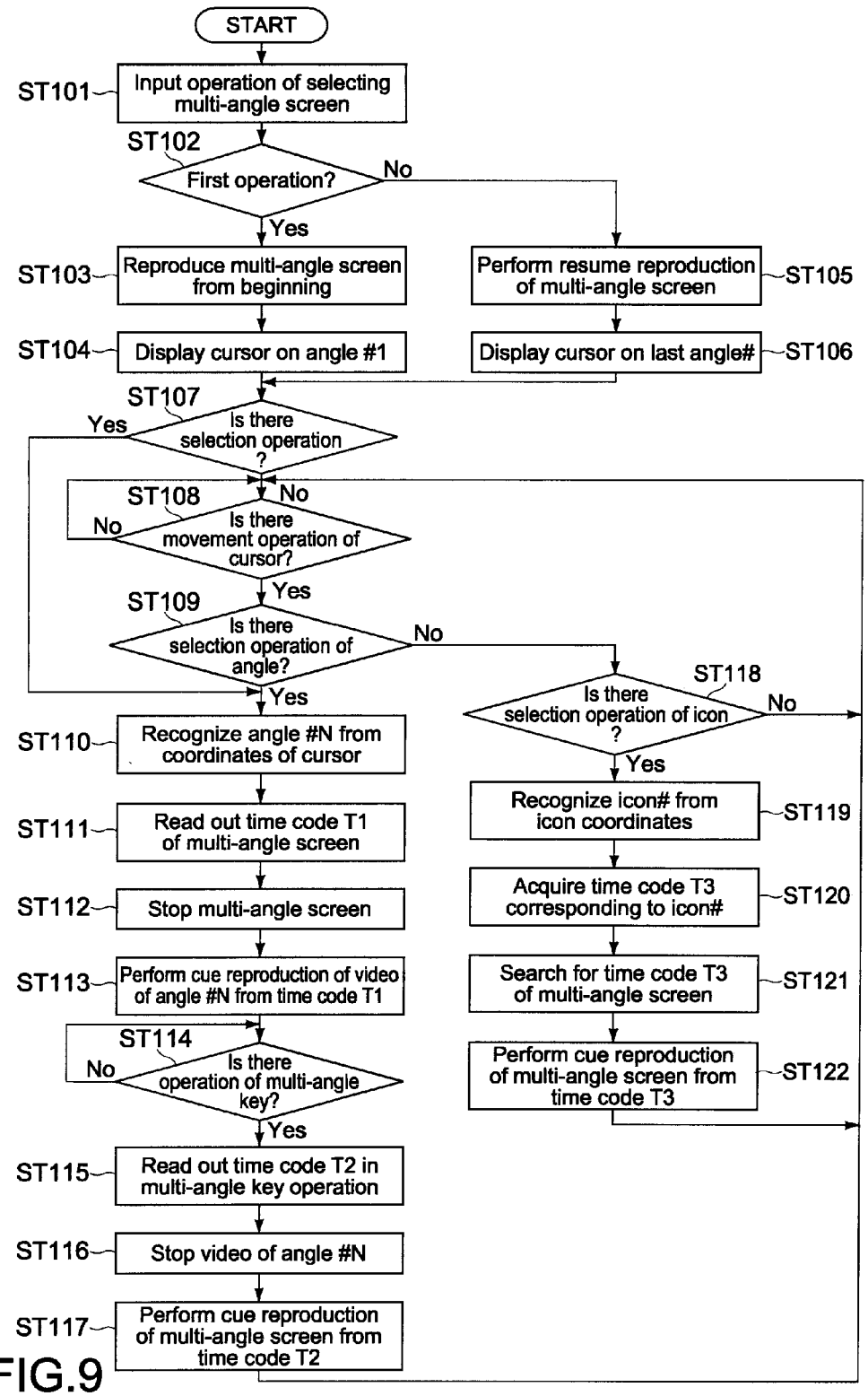
FIG. 9 A flowchart showing a reproduction operation of the recording/reproducing apparatus in the first embodiment of the present invention.
Figure 10:
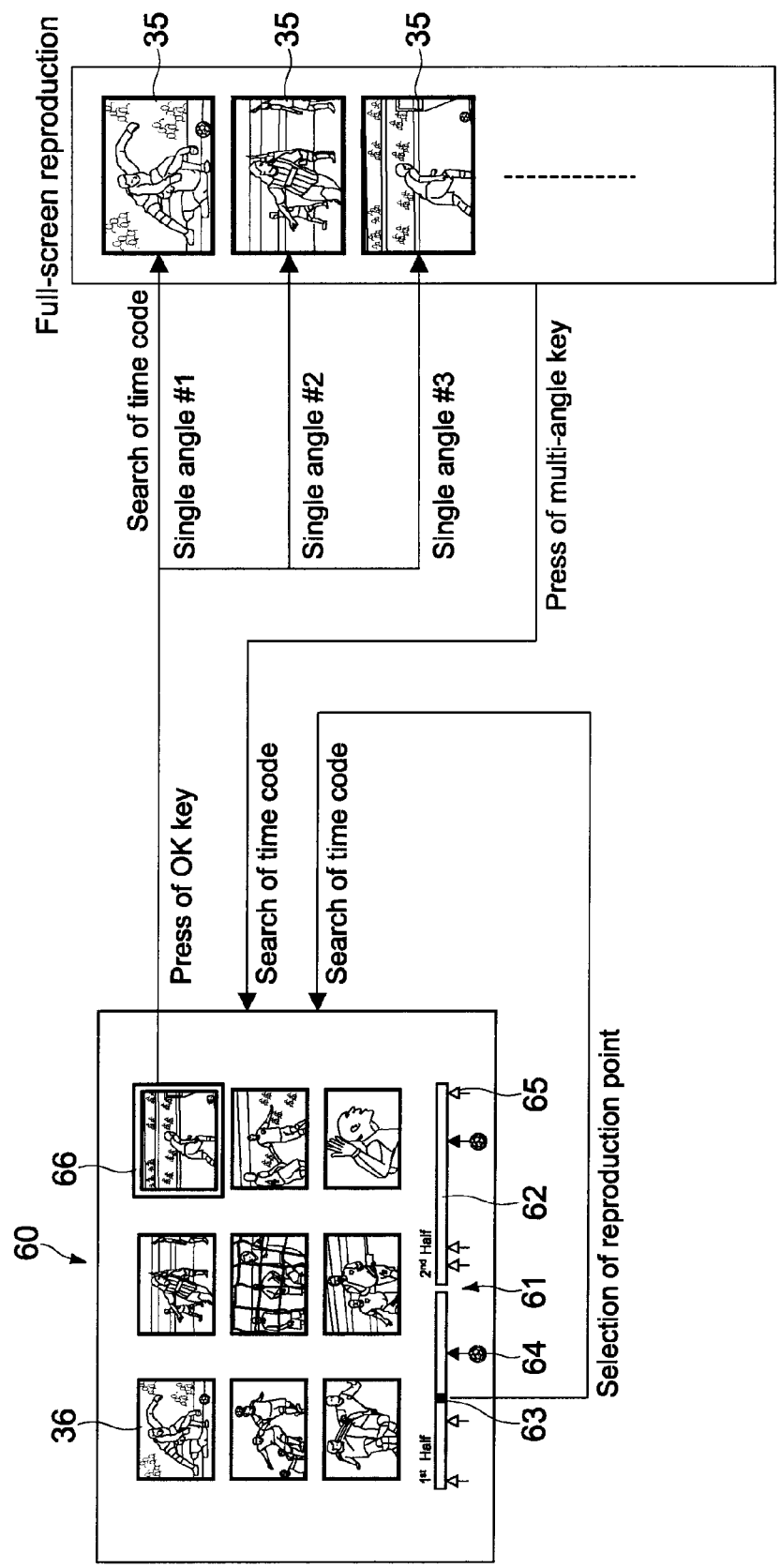
FIG. 10 A diagram conceptually showing the reproduction operation of the recording/reproducing apparatus in the first embodiment of the present invention.
Figure 11:
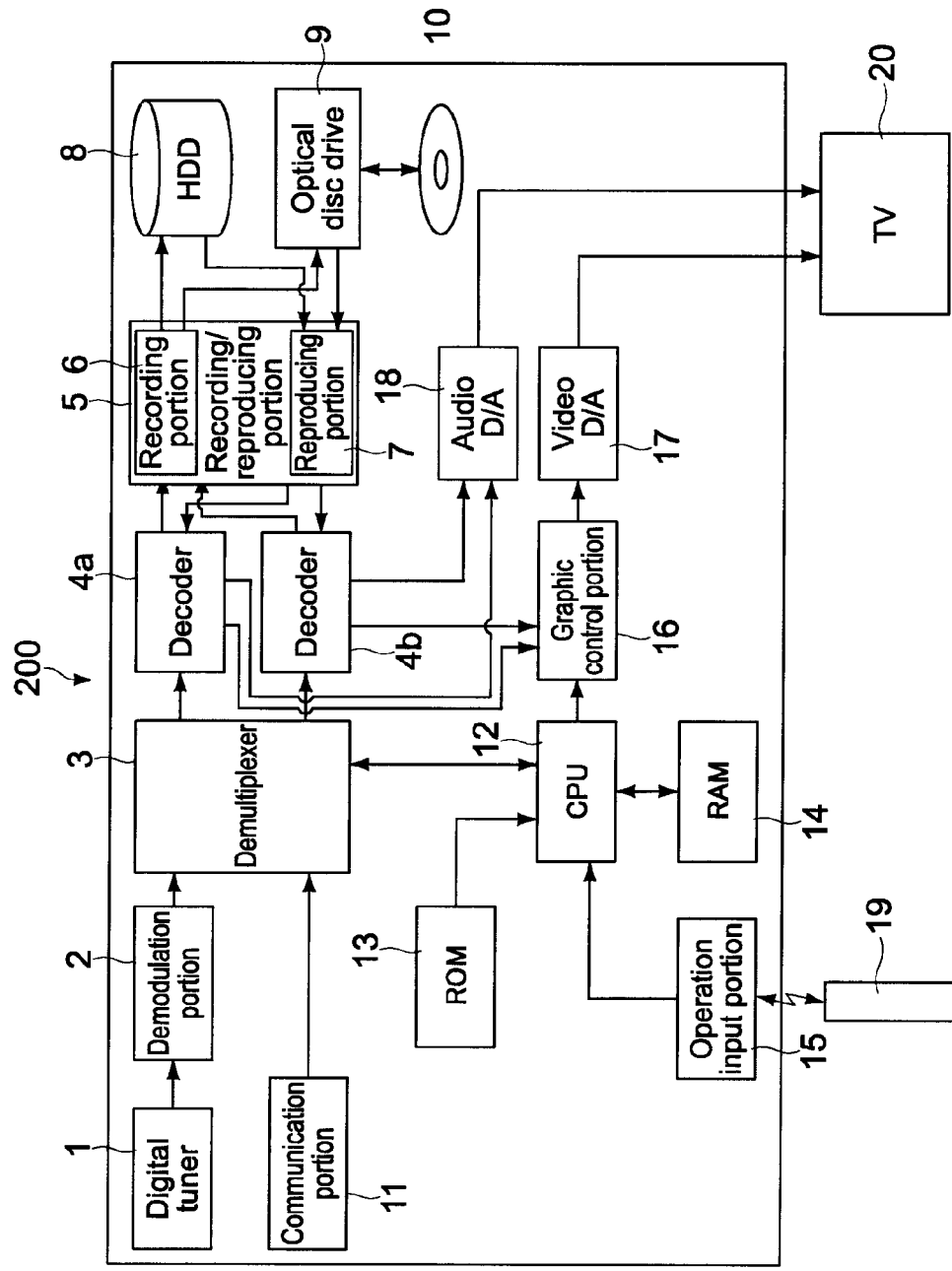
FIG. 11 A block diagram showing a structure of a recording/reproducing apparatus according to a second embodiment of the present invention.
Figure 12:
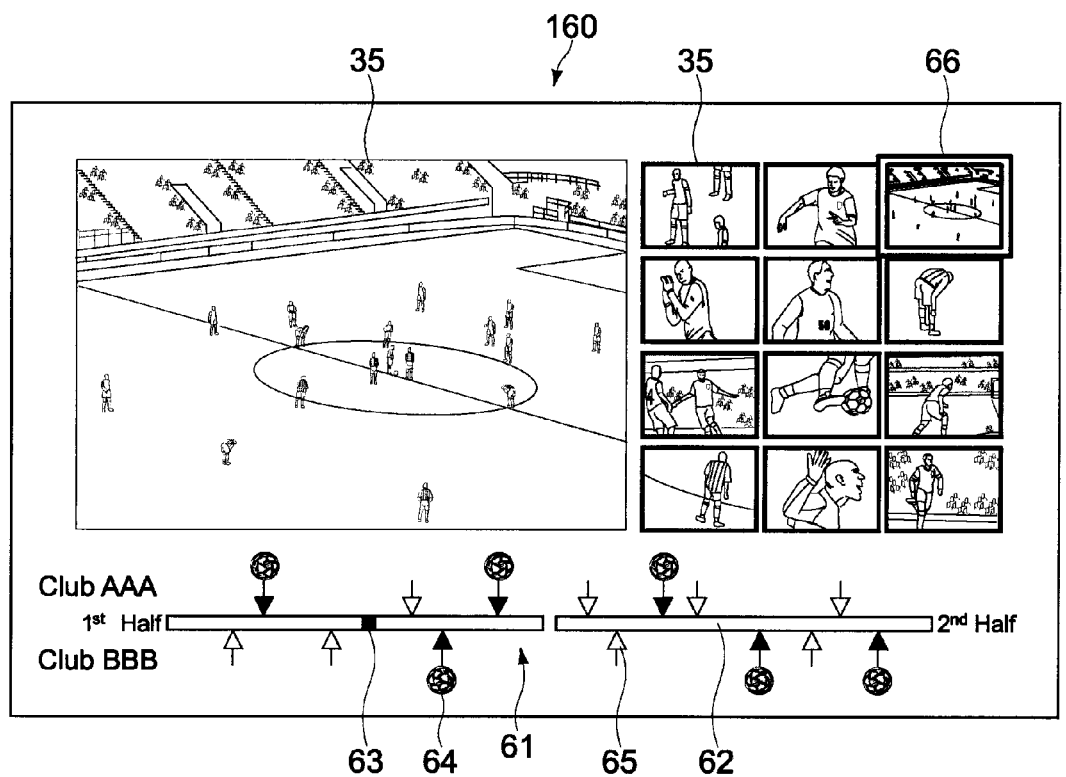
FIG. 12 A diagram showing a multi-angle screen reproduced from a BD-ROM in the second embodiment of the present invention.
Figure 13:
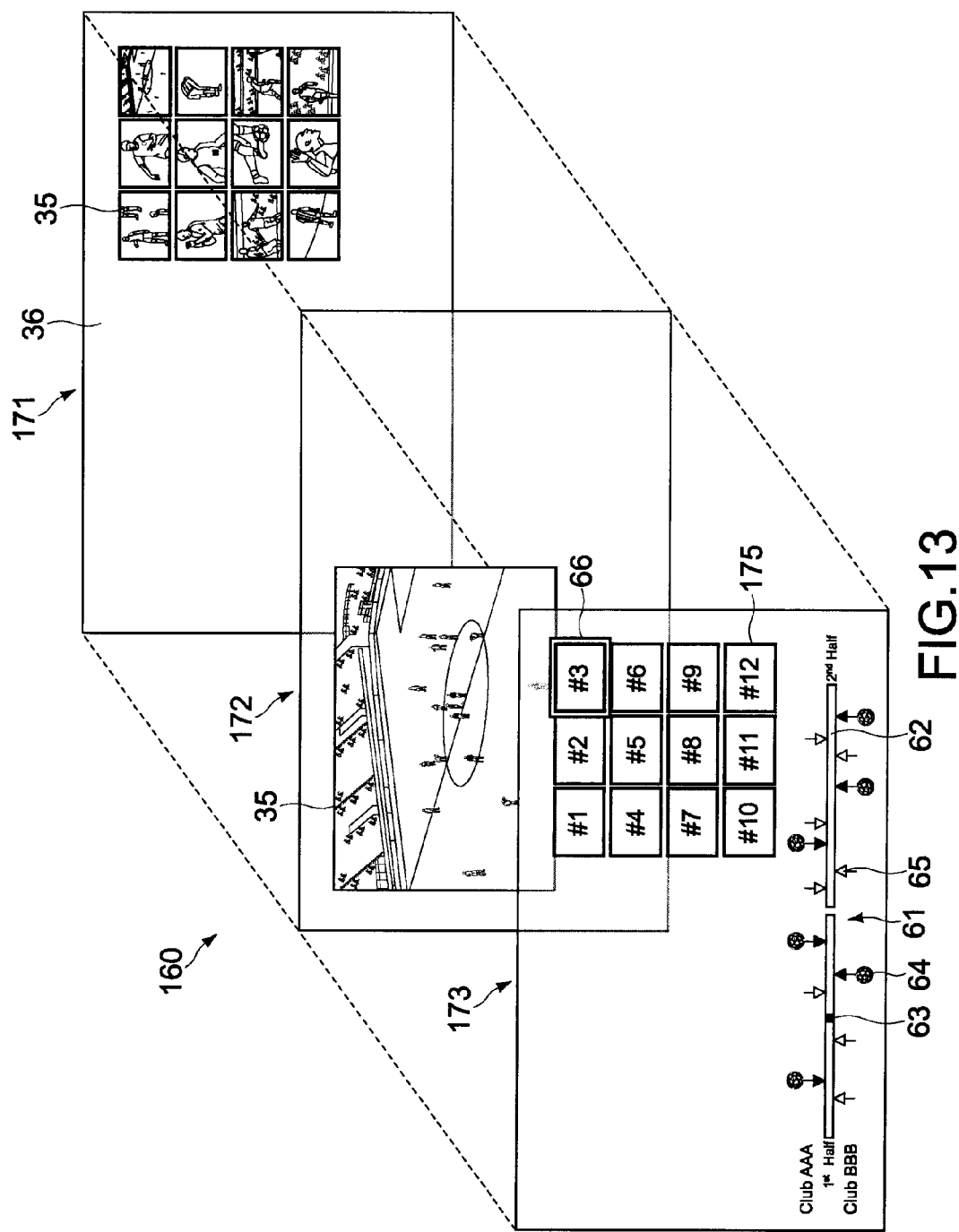
FIG. 13 A diagram showing a layer structure of the multi-angle screen in the second embodiment of the present invention.
Figure 14:
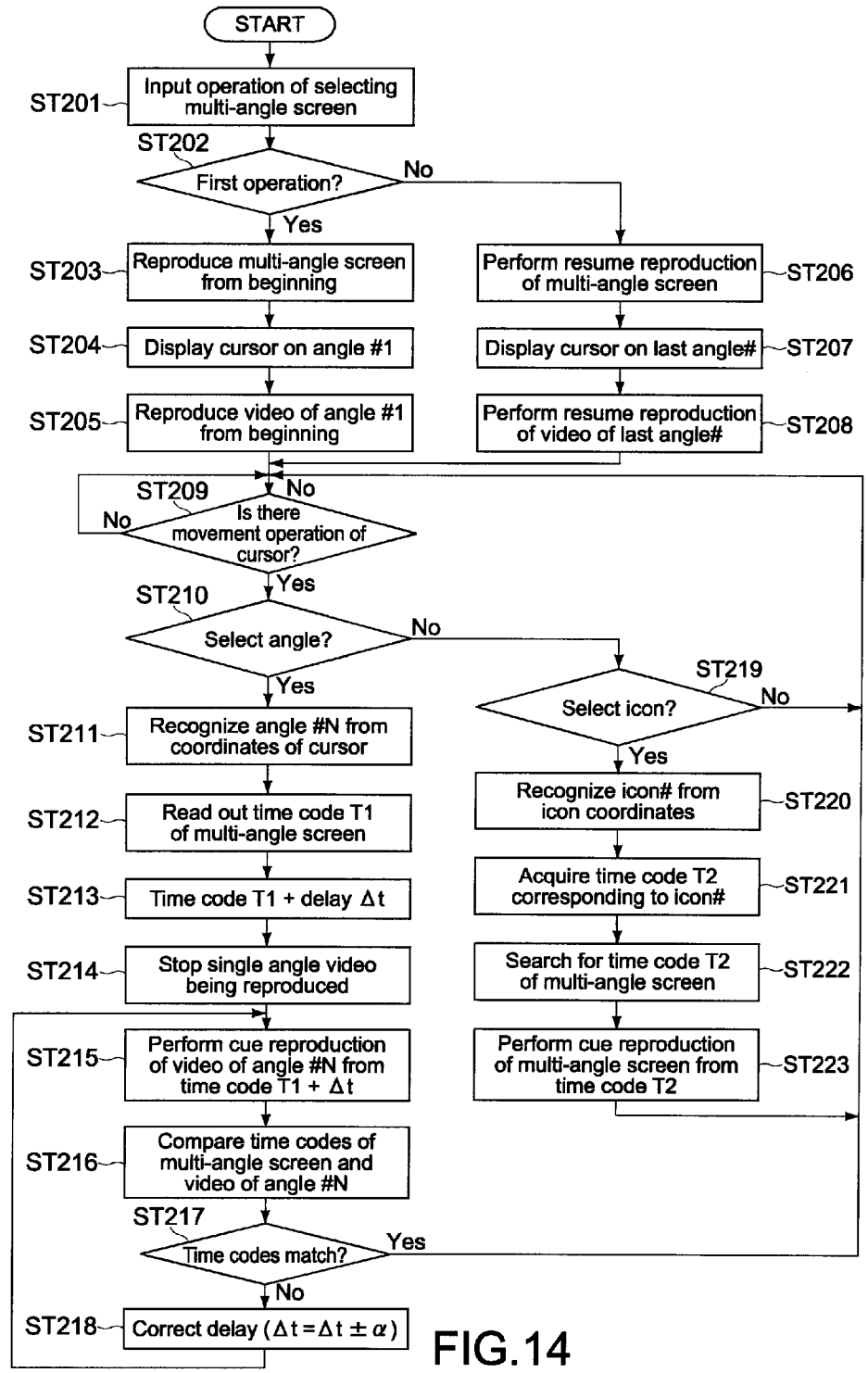
FIG. 14 A flowchart showing a reproduction operation of the recording/reproducing apparatus in the second embodiment of the present invention.
Figure 15:
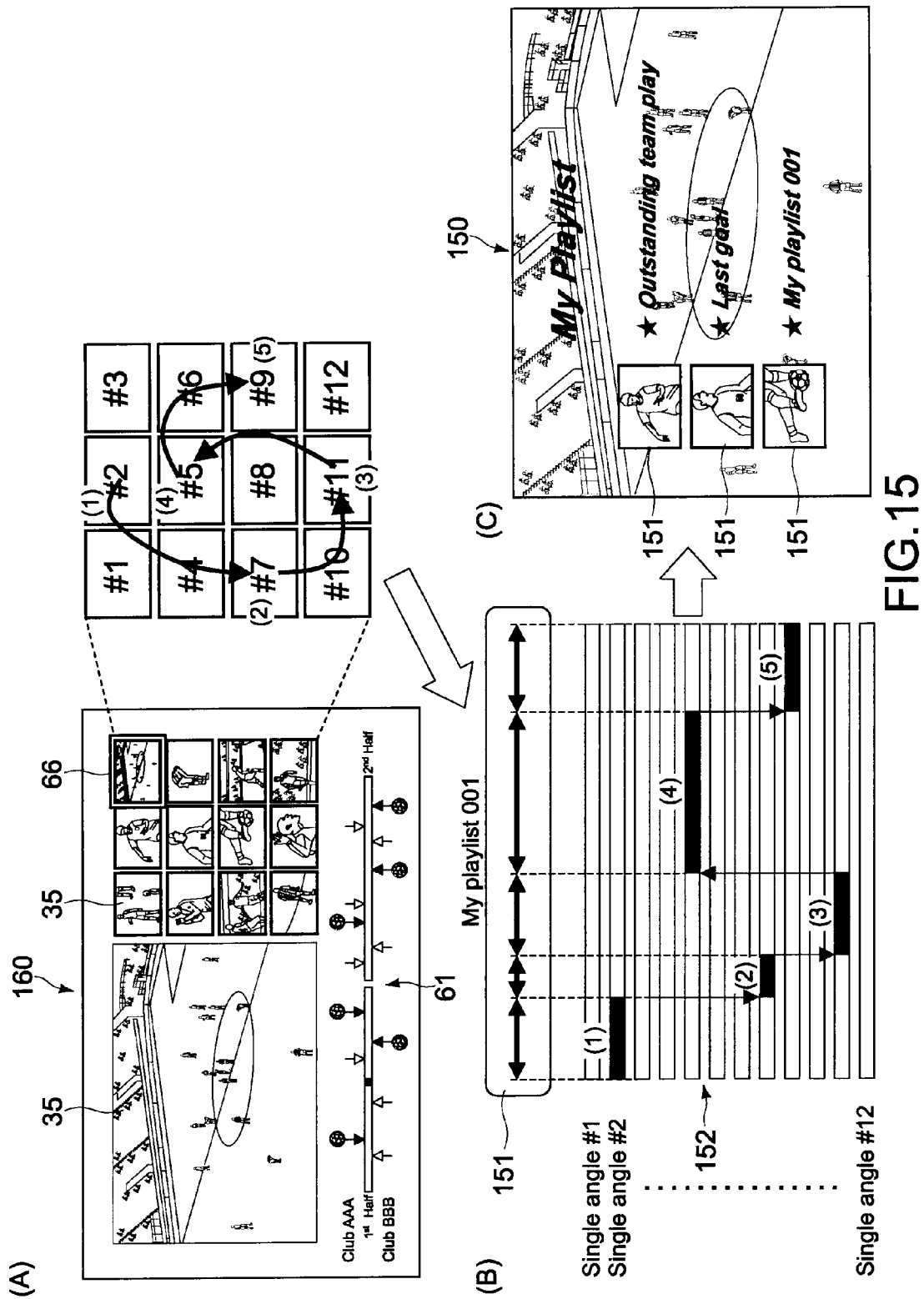
FIG. 15 Diagrams conceptually showing playlist creation processing in the second embodiment of the present invention.
Figure 16:
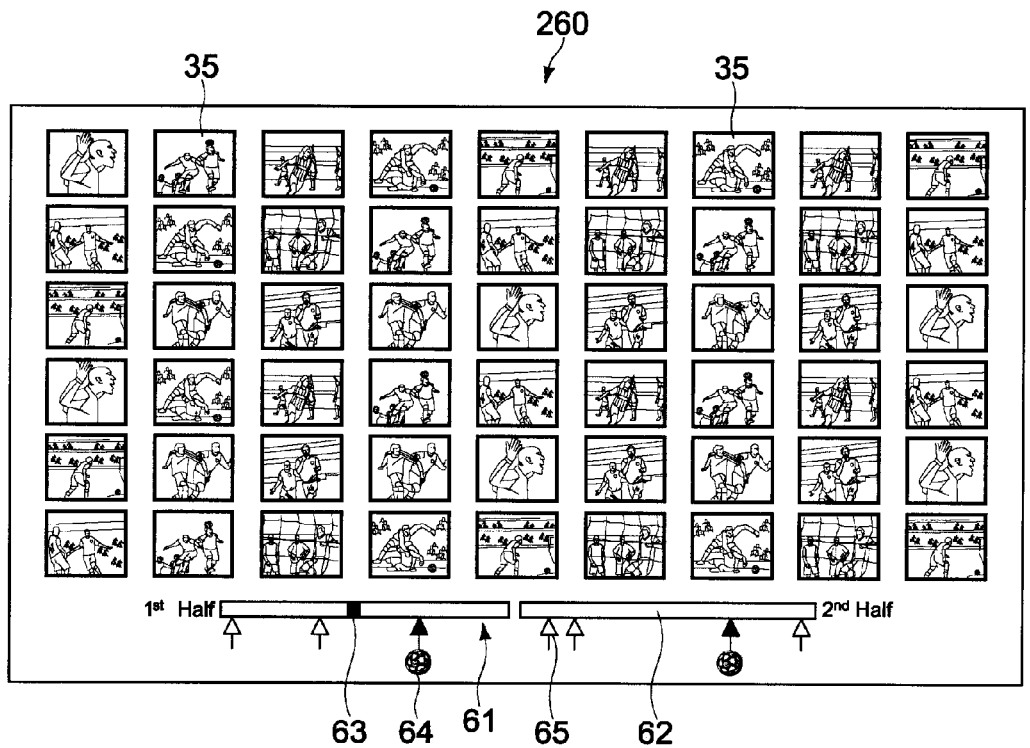
FIG. 16 A diagram showing a multi-angle screen reproduced from a BD-ROM in another embodiment of the present invention.
Figure 17:
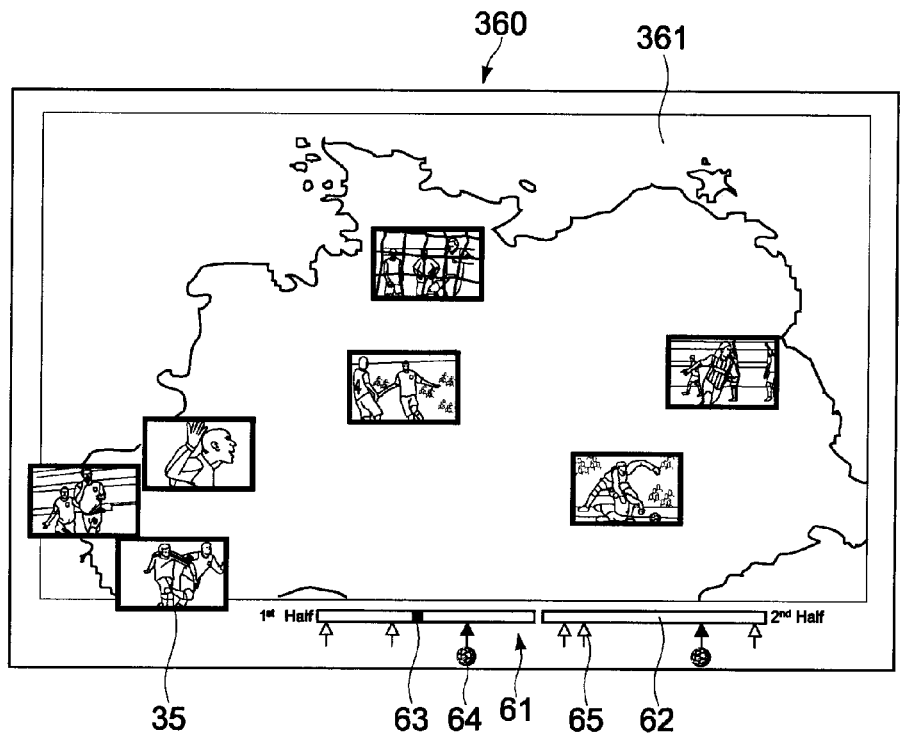
FIG. 17 A diagram showing a multi-location screen reproduced from a BD-ROM in still another embodiment of the present invention.
Figure 18:
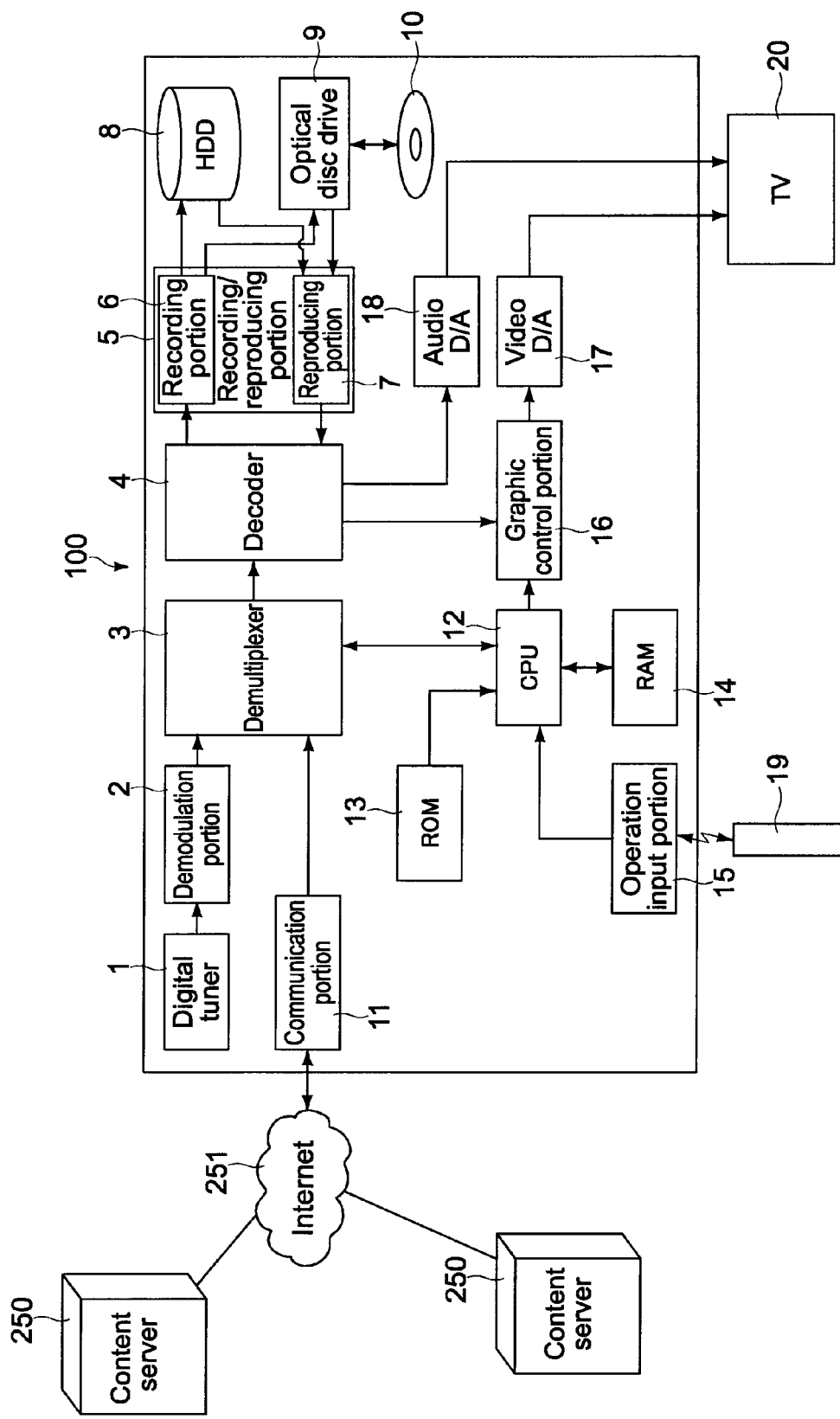
FIG. 18 A block diagram showing a structure of a recording/reproducing apparatus according to still another embodiment of the present invention.

4(4a, 4b) decoder
5 recording/reproducing portion
8 HDD
9 optical disc drive
10 BD-ROM
11 communication portion
12 CPU
14 RAM
15 operation input portion
19 remote controller
20 television apparatus (TV)
23 multi-angle key
24 menu key
25 arrow key
26 OK key
35 single angle video
36 multi-angle video
40 index table
50 menu screen
60, 160, 260 multi-angle screen
61 time-line operation bar
63 focus
64 goal icon
65 shot icon
66 cursor
71, 171 primary video plane
172 secondary video plane
72, 173 interactive graphics plane
75 area
80 icon/time-code correspondence table
100, 200 recording/reproducing apparatus
151 playlist
152 reproduction history information
250 content server
251 network
360 multi-location screen
361 map image

The invention claimed is:

1. An electronic apparatus, comprising:
an input means for inputting a plurality of different first single angle video contents each having the same first time code and a second multi-angle video content having a second time code that is the same as the first time code, the second video content being edited so that the plurality of first video contents are simultaneously reproduced within one screen;
a reproduction means for reproducing the input first and second video contents;
an operation input means for inputting, from a user, a first operation of selecting any of the first video contents during reproduction of the second video content, wherein all of the first video contents displayed during reproduction of the second video content are selectable for subsequent reproduction; and
a control means for controlling the reproduction means to, in a case where the first operation is input, reproduce the selected first video content based on the first time code corresponding to the second time code at a time when the first operation is input,
wherein:
the first and second video contents are recorded on a portable recording medium,
the input means includes means for reading each of the first and second video contents from the recording medium; and
the control means includes
means for controlling the reproduction means to display a time-line image that indicates a time line of the second video content and an icon that indicates a predetermined scene having the second time code predetermined on the time line, together with the reproduced second video content, and
means for controlling the reproduction means to move a reproduction point of the second video content to the predetermined scene based on the second time code corresponding to the icon in a case where an operation of selecting the icon is input by the operation input means from the user.

2. The electronic apparatus according to claim 1, wherein the reproduction means includes one decoder that decodes the first and second video contents, wherein the operation input means inputs, from the user, a second operation of instructing reproduction of the second video content during the reproduction of the first video content, and wherein the control means controls the reproduction means to, in a case where the first operation is input, reproduce the first video content instead of the second video content based on the first time code corresponding to the second time code at the time when the first operation is input, and controls the reproduction means to, in a case where the second operation is input, reproduce the second video content instead of the first video content based on the second time code corresponding to the first time code at a time when the second operation is input.

3. The electronic apparatus according to claim 1, wherein the reproduction means includes a first decoder that decodes the first video contents and a second decoder that decodes the second video content, and wherein the control means controls the reproduction means to reproduce the first video contents in a first area within the one screen and controls the reproduction means to reproduce the second video content in a second area that is different from the first area within the one screen.

4. The electronic apparatus according to claim 3, wherein the control means controls the reproduction means to, in a case where the first operation is input, reproduce the selected first video content based on the first time code corresponding to a third time code obtained by adding a predetermined time to the second time code at the time when the first operation is input.

5. The electronic apparatus according to claim 4, wherein the control means includes means for judging whether the third time code and the second time code at a time when the selected first video content is reproduced are matched with each other, and means for performing correction so that the third time code is matched with the second time code, in a case where it is judged by the comparison that the third time code and the second time code are not matched with each other.

6. The electronic apparatus according to claim 3, wherein the first video content reproduced in the first area within the one screen displays the same single angle video content as a selected first video content simultaneously reproduced as part of the second video content in the second area within the one screen.

7. The electronic apparatus according to claim 1, further comprising a storage means for storing reproduction history information of the plurality of first video contents that have been reproduced based on an input of the first operation, wherein the control means includes a generation means for generating, based on the reproduction history information, a third video content in which the plurality of first video contents that have been reproduced are linked in a reproduction order, and wherein the reproduction means reproduces the generated third video content.

8. The electronic apparatus according to claim 7, wherein the reproduction means includes means for adding a predetermined video effect to the reproduced first video contents, wherein the storage means stores the added predetermined video effect as a part of the reproduction history information of each of the first video contents, and wherein the generation means generates the third video content by linking the first video contents with the stored predetermined video effects being added.

9. The electronic apparatus according to claim 1, wherein the operation input means inputs, from the user, a third operation of designating any position on the displayed time-line image during the reproduction of the second video content, and wherein the control means controls the reproduction means to display the icon at the designated any position on the displayed time-line image so that the icon can be selected in a case where the third operation is input, the electronic apparatus further comprising a storage means for storing the second time code for reproducing the second video content from a scene corresponding to the any position at which the icon is displayed.

10. The electronic apparatus according to claim 1, wherein the plurality of first video contents are respectively shot in different predetermined locations, and wherein the second video content includes a predetermined map image including the predetermined locations and a plurality of areas that are arranged to respectively reproduce the plurality of first video contents at positions indicating the predetermined locations on the predetermined map image.

11. A reproduction method, comprising:

inputting a plurality of different first single angle video contents each having the same first time code and a second multi-angle video content having a second time code that is the same as the first time code, the second video content being edited so that the plurality of first video contents are simultaneously reproduced within one screen;

reproducing the second video content;

inputting, from a user, a first operation of selecting any of the first video contents during reproduction of the second video content, wherein all of the first video contents displayed during reproduction of the second video content are selectable for subsequent reproduction;

reproducing, in a case where the first operation is input, the selected first video content based on the first time code corresponding to the second time code at a time when the first operation is input;

displaying a time-line image that indicates a time line of the second video content and an icon that indicates a predetermined scene having the second time code predetermined on the time line, together with the reproduced second video content; and moving a reproduction point of the second video content to the predetermined scene based on the second time code corresponding to the icon in a case where an operation of selecting the icon is input by the operation input means from the user.

12. A portable recording medium having stored thereon a program that when executed by a processor causes an electronic apparatus to execute:

a step of inputting a plurality of different first single angle video contents each having the same first time code and a second multi-angle video content having a second time code that is the same as the first time code, the second video content being edited so that the plurality of first video contents are simultaneously reproduced within one screen;

a step of reproducing the second video content;

a step of inputting, from a user, a first operation of selecting any of the first video contents during reproduction of the second video content, wherein all of the first video contents displayed during reproduction of the second video content are selectable for subsequent reproduction;

a step of reproducing, in a case where the first operation is input, the selected first video content based on the first time code corresponding to the second time code at a time when the first operation is input;

a step of displaying a time-line image that indicates a time line of the second video content and an icon that indicates a predetermined scene having the second time code predetermined on the time line, together with the reproduced second video content; and a step of moving a reproduction point of the second video content to the predetermined scene based on the second time code corresponding to the icon in a case where an operation of selecting the icon is input by the operation input means from the user.

* * * * *